United States Patent
Sutrave et al.

(10) Patent No.: US 12,038,916 B1
(45) Date of Patent: Jul. 16, 2024

(54) USER INTERFACE FOR FORMULATING STRUCTURED QUERIES AND GENERATING GRAPHICAL OBJECTS WITHIN A CONTENT COLLABORATION PLATFORM

(71) Applicants: Atlassian Pty Ltd., Sydney (AU); Atlassian US, Inc., San Francisco, CA (US)

(72) Inventors: Vijay Sutrave, Sydney (AU); Tong Li, Sydney (AU); Hector Zarco Garcia, Sydney (AU); Andre Mauritz, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 18/091,891

(22) Filed: Dec. 30, 2022

(51) Int. Cl.
*G06F 16/00* (2019.01)
*G06F 3/0483* (2013.01)
*G06F 3/04842* (2022.01)
*G06F 9/54* (2006.01)
*G06F 16/242* (2019.01)

(52) U.S. Cl.
CPC ........ *G06F 16/2428* (2019.01); *G06F 3/0483* (2013.01); *G06F 3/04842* (2013.01); *G06F 9/547* (2013.01)

(58) Field of Classification Search
CPC .............. G06F 16/2428; G06F 3/0483; G06F 3/04842; G06F 9/547
See application file for complete search history.

(56) References Cited

U.S. PATENT DOCUMENTS

| | | |
|---|---|---|
| 10,324,591 B2 | 6/2019 | Room |
| 11,868,706 B1 | 1/2024 | Lu et al. |
| 2009/0094538 A1* | 4/2009 | Ringler ................. G06F 40/174 715/810 |
| 2011/0270815 A1* | 11/2011 | Li ..................... G06F 16/24522 707/706 |
| 2019/0294659 A1 | 9/2019 | Sethi et al. |

* cited by examiner

*Primary Examiner* — Jared M Bibbee
(74) *Attorney, Agent, or Firm* — Brownstein Hyatt Farber Schreck, LLP

(57) ABSTRACT

The disclosure is directed to systems and techniques for executing a documentation application displaying a graphical user interface having a content-creation field configured to receive textual input. A link-creation window may be generated, which facilitates browsing content without leaving a current application. Using the disclosed interface, a user can generate a selectable graphical object that links to other content, the selectable graphical object created from within the context of the content-creation field interface.

20 Claims, 15 Drawing Sheets

SPACE 1
- OVERVIEW
- BLOG
- QUESTIONS
- ANALYTICS
- CALENDARS
- SPACE SETTINGS
- BULK ARCHIVE

APPS
- TOPIC
- DIAGRAMS
- SHOW MORE

PAGES
- WEEKLY MEETING NOTES
- PAGES
- ARCHIVED PAGES

HOME ∨ RECENT ∨ SPACES ∨ PEOPLE ∨ APPS ∨ TEMPLATES    CREATE    SEARCH

720

| OPTION | NOTES |
|---|---|
| OPTION 1:<br>*Lorem ipsum dolor sit amet, consectetur adipiscing elit. Nunc dui urna, bibendum a eros et, semper suscipit risus.*<br>RECOMMENDED | • POINT 1<br>• POINT 2<br>• POINT 3 |
| OPTION 2:<br>*Lorem ipsum dolor sit amet, consectetur adipiscing elit. Nunc dui urna, bibendum a eros et, semper suscipit risus.* | • POINT 1<br>• POINT 2 |

710
712
700

PROJECT LIST OF LINKS
PULLING TOGETHER ALL THE RELATED WORK FOR THE 🔗 LAUNCH

800a

| TITLE | PRIORITY | STATUS | DUE DATE | 👤 |
|---|---|---|---|---|
| 🔲 KIWI-12239: Fix janky email bug in template | ≋ MAJOR | DONE | 25 AUG, 2022 | 👤 |
| 📝 Marketing coordination work | ▲ CRITICAL | DOING | 15 SEPT, 2022 | 👤 |
| 🔗 [Task]: Start marketing rollout | ≋ MINOR | OPEN | 10 SEPT, 2022 | 👤 |
| 🔺 Run A/B tests | ═ MEDIUM | TRIAGE | 5 AUG, 2022 | 👤 |

810a → Run A/B tests

🔺 RUN A/B TESTS     🗗
PRODUCT DEVELOPMENT

🔍 CREATED BY JOHN DOE     💬 4

LET'S RUN AN A/B TEST WITH THE NEW TEMPLATE AND SEE IF IT CONVERTS BETTER. WE'RE HOPING TO SEE A 10% HIGHER CTR ON EMAILS USING THE NEW TEMPLATE.

🔺 ITS     [PREVIEW]

PROJECT LIST OF LINKS
PULLING TOGETHER ALL THE RELATED WORK FOR THE 🔗 LAUNCH

800b

| TITLE | PRIORITY | STATUS | DUE DATE | 👤 |
|---|---|---|---|---|
| 🔲 KIWI-12239: Fix janky email bug in template | ≋ MAJOR | DONE | 25 AUG, 2022 | 👤 |
| 📝 Marketing coordination work | ▲ CRITICAL | DOING | 15 SEPT, 2022 | 👤 |
| 🔗 [Task]: Start marketing rollout | ≋ MINOR | OPEN | 10 SEPT, 2022 | 👤 |
| 🔺 Run A/B tests | ═ MEDIUM | TRIAGE | 5 AUG, 2022 | 👤 |

[🔗 LINK EXISTING] [+ CREATE NEW]

820b

OPEN
DOING
BLOCKED
DONE

USER INTERFACE FOR FORMULATING STRUCTURED QUERIES AND GENERATING GRAPHICAL OBJECTS WITHIN A CONTENT COLLABORATION PLATFORM

FIELD

The described embodiments relate generally to techniques for generating content and links in a graphical user interface. More particularly, the embodiments relate to systems and techniques for creating selectable graphical objects within a content collaboration platform.

BACKGROUND

Electronic documents and other electronic content have become essential resources for product development teams that may be geographically distributed or otherwise rely on remotely hosted computer resources. Using an electronic medium, content can be easily shared and published using a variety of techniques. In some cases, it can be useful to link to content created by other teams or content sources to reduce redundancy and improve the efficiency of accessing various electronic resources. However, many traditional link creation techniques require the user to type or enter a specific URL path, which can be prone to error if entered manually or, otherwise, requires that the user switch applications to navigate through the specific electronic organizational scheme of the other party's content. Furthermore, traditional linking techniques are only suitable for directing the user to a web-address level content and cannot readily link to content within a page or link to readily create a link to multiple objects. Further, traditional hyperlinks, while useful for redirecting a user, may provide sparse information about the content being linked to, requiring the user to select the hyperlink in order to determine the nature of the content. The systems and techniques described herein can be used to create selectable graphical objects quickly and without having to switch applications or views (e.g., context switch), while also reducing overall redundancy and improving computing efficiency by providing active electronic links between different content sources.

SUMMARY

Some example embodiments are directed to a computer-implemented method of rendering remotely hosted data in a graphical user interface. Some example embodiments are directed to an object-creation service that can be used to create table objects or other multi-element objects within an electronic page or document. As described herein, the graphical selectable objects may be generated using an object-creation window that allows for the creation of one or multiple links from within the context of the content creation region of a graphical user interface. The object-creation window may include an expression editor region that allows a user to construct and/or modify a query that is used to fetch or populate a query results region of the window in real time, as the partial or completed expression is edited.

Some example embodiments are directed to a computer-implemented method of rendering issue objects in a graphical user interface. The method may include instantiating a client application on a client device. The client application displays the graphical user interface having a content-creation region operating an editor configured to receive textual input via a keyboard of the client device. A command to initiate creation of a selectable graphical object may be received within the content-creation region. In response to receiving the command, an object-creation service may be invoked causing display of a link-creation window overlaying the content-creation region. The link-creation window may include: an expression editor region configured to receive text input and evaluate the text input to produce a structured issue query on an issue tracking system; a query-results region configured to display a set of results produced on the evaluation of the structured issue query generated in response to the text input, the set of results automatically updated in response to a change in the text input; and an object-creation control. In response to a user selection of the object-creation control, the system may cause creation of a table object within the content-creation region. The table object may include a set of rows, each row including a respective issue object corresponding to a respective issue of the set of results produced on the evaluation of the structured issue query. In response to a save command, user-generated content including the table object is stored as a page of a content collaboration platform. In some implementations, user selection of the respective issue object in the table object causes a redirection to an issue tracking application displaying issue data of the respective issue. In some implementations, in response to a publish command, the page is published to a set of users of the content collaboration platform.

In some embodiments, upon the display of the link-creation window, the expression editor region contains a default expression framework. The default expression framework may be user-editable through the expression editor region. In some cases, the expression editor region is operably coupled to the issue tracking system through an advanced programming interface. User input provided to the expression editor region causes a creation of a structured query. The structured query may be executed on an issue storage database of the issue tracking system using the advanced programming interface.

In some cases, the table object includes multiple columns. Issue data extracted from the respective issue is inserted in one or more first columns of the multiple columns, and the respective issue object is positioned in a second column of the multiple columns. The issue tracking system is configured to modify the issue data to generate updated issue data, and in response to the modification of the issue data, the updated issue data is displayed in the table object upon a subsequent load of the page in the content collaboration platform.

In some embodiments, the method further comprises authenticating a user of the client device using a user credential received from the user and obtaining user permissions for a user account associated with the authenticated user. The user permissions may specify at least read and edit permissions with respect to issues of the issue tracking system. An object discovery tool may be configured to suppress display of results for which the user permissions do not allow read access to corresponding issues of the issue tracking system.

Some example embodiments are directed to a computer-implemented method of rendering graphical selectable objects in a graphical user interface. The computer-implemented method may include causing display of the graphical user interface of a client application on a client device, the graphical user interface having a content-creation region operating an editor configured to receive user-generated content. A command to initiate creation of a selectable graphical object may be received within the content-creation region. In response to receiving the command, an object-creation service may be invoked causing display of an object-creation window overlaying the content-creation region. The object-creation window may include: an expression editor region configured to receive text input and evaluate the text input to produce a structured query on a data store of a separate platform; a query results region configured to display a set of results produced on evaluation of the structured query generated in response to the text input; and an object-creation control. In response to a user selection of the object-creation control, the system may cause creation of a table object within the content-creation region. The table object may include a set of rows, each row including a respective graphical selectable object corresponding to a respective result of the set of results produced on the evaluation of the structured query. In response to a save command, the user-generated content including the table object may be stored as an electronic document of a content collaboration system.

In some implementations, the expression editor region is operably coupled to the separate platform through an advanced programming interface. User input to the expression editor region causes creation of a structured query. The structured query may be executed on a data store of the separate platform using the advanced programming interface. In some cases, each graphical selectable object of the table object is selectable from within the table object. In response to selection of the respective graphical selectable object, the graphical user interface is redirected to an interface of the separate platform. In some cases, the separate platform is an issue tracking platform. The set of results may correspond to a set of issues managed by the issue tracking platform. A selection of the respective graphical selectable object may redirect the graphical user interface to an issue view interface of the issue tracking platform. In some implementations, each row corresponds to a respective object managed by the separate platform. The separate platform may include an interface for editing the respective object. In response to a modification to the respective object, content of the table object within the electronic document is automatically updated.

In some embodiments, in response to a hover user input command, an object control is displayed proximate to the table object. In response to a user selection of an option displayed by the object control, cause the table object to be replaced with a list of objects. An object of the list of objects corresponds to a row of the table object.

In some cases, in response to a first user input, an object control is displayed proximate to the table object. In response to a second user input provided to the object control, the system may cause the table object to be replaced with a project object. The project object may include a set of timeline elements, each timeline element corresponding to a row of the table object.

Some example embodiments are directed to a content collaboration platform comprising a content collaboration backend application operating on one or more servers. The content collaboration backend application may be operably coupled to a frontend application operating on a client device. The content collaboration backend application configured to cause display of a page generation graphical user interface on the frontend application operating on the client device. The page generation graphical user interface includes a content-creation region. In response to an invocation of an object-creation service, the platform may cause display of an object-creation window within the page generation graphical user interface. The object-creation window may include: an expression editor region configured to receive text input and evaluate the text input to produce a structured query on a data store of a separate backend application distinct from the content collaboration backend application; a query results region configured to display a set of results produced on the evaluation of the structured query generated in response to the text input; and an object-creation control. In response to a user selection of the object-creation control, the platform may cause creation of a multi-element object within the content-creation region, the multi-element object including a set of rows, each row including a respective graphical selectable object corresponding to a respective result of the set of results produced on the evaluation of the structured query. In response to a save command, user-generated content including the multi-element object may be stored as an electronic document of the content collaboration platform. In some cases, selection of the respective graphical selectable object causes a redirection of the page generation graphical user interface to an interface generated in accordance with the separate backend application. Each row may include data extracted from a respective object managed by the separate backend application. A modification of the respective object by the separate backend application may cause a corresponding change in respective data positioned in a respective row of a table object.

In some cases, the separate backend application is a backend application of an issue tracking platform. The set of results may corresponds to issues managed by the issue tracking platform that satisfy the structured query.

In some cases, in response to an input provided to an object control, cause a table object to be replaced with a list of objects. Each object of the list of objects may correspond to a respective row of the set of rows of the table object.

BRIEF DESCRIPTION OF THE DRAWINGS

The disclosure will be readily understood by the following detailed description in conjunction with the accompanying drawings.

FIG. 3 depicts an example table object replacing the object-creation window in the content-creation region of the graphical user interface.

FIGS. 4B-4E depict examples of multi-element objects created using the techniques described herein.

FIGS. 7A-7B depict example user-generated content for a first or source document and a second or target document.

FIGS. 8A-8B depict content modification operations with respect to a table or other multi-element object within user-generated content.

DETAILED DESCRIPTION

Figure 1:
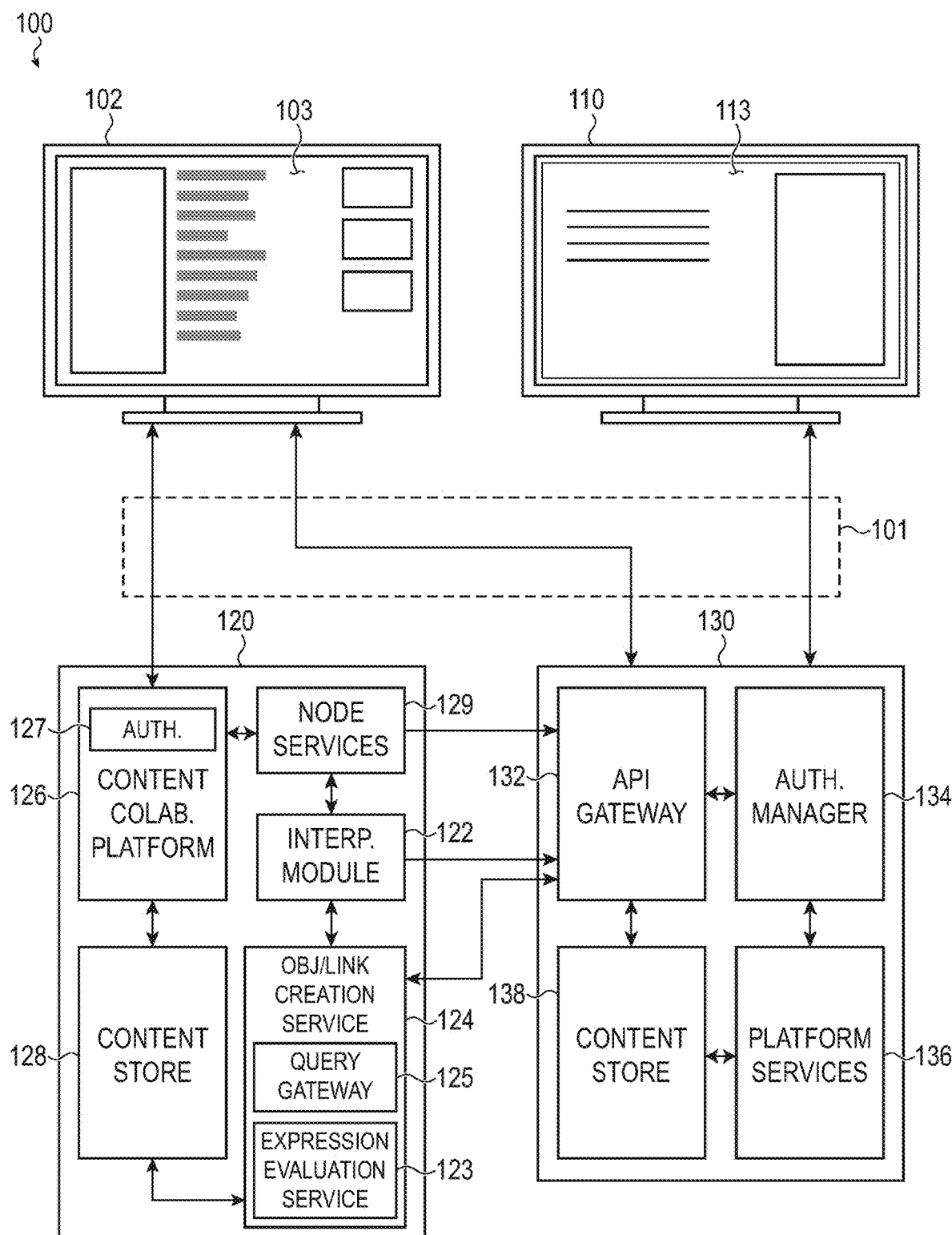
FIG. 1 depicts an example system used for generating selectable graphical objects.

The following examples and illustrations are provided to demonstrate various embodiments of the disclosed system and techniques for using the system. The examples and illustrations may be directed to specific implementations. However, the concepts and corresponding claims appending this patent application can be applied to other implementations that vary in some respects with respect to the example provided herein.

In general, electronic content can be shared or distributed using electronic communication tools that publish or otherwise distribute the electronic content to a group of users. As many content and software providers are transitioning to software as a service (SAAS) platforms, web browsers and web tools can be used to create and share electronic content between teams and various other users. However, sharing content across different platforms or accessing data from other content providers can be cumbersome or difficult. Traditionally, users are required to navigate to a particular webpage or web-hosted content in order to access or view content provided by a separate platform or application. In order to facilitate more rapid access to other content, users may type or enter a URL into their own content, which may be used to create a traditional hyperlink. However, some current hyperlink creation techniques require that the user access multiple web interfaces or screens, which consumes additional computing resources and may require a complex set of interface selections and interactions, which may lead to error and inoperable or inaccurate hyperlinks. Furthermore, once links are established, some traditional hyperlinks appear as lengthy URL paths or other text that may be practically indecipherable to the user or provide little information about the target content being linked.

Furthermore, some linking techniques are only able to be resolved at the URL level and typically do not link to sub-page or sub-document level content. Additionally, some linking techniques require the user to know of or have access to each of the target objects to be linked. The techniques described herein can be used to designate portions of a document or page for linking into other documents or pages. In particular, a portion or snippet of a structured document may be designated with a particular content type enabling a link-creation command. Selecting the link-creation command with respect to the document node or snippet and a subsequent node or link creation command in another document may result in the linked node or snippet to be rendered in the separate document. Using a unique identifier associated with the node or snippet, the system may be configured to synchronize the node content across documents that include the respective node. As described herein, the synchronizing service or node provider service, as referred to herein, may be used to provide two-way synchronization of content in which modifications to either the source or target node content may be used to update the other respective node.

The techniques described herein can also be used to discover and generate linked content. As described herein, the system can be used to generate custom queries that can be evaluated in real time to provide a list of linkable content that can be used to create graphical selectable graphical objects. Further, when multiple results may be returned for a given query, the system may create a multi-element object within the user-generated content having elements that link to each of the respective results returned by the query. As described herein, the multi-element objects may include a table object, timeline object, roadmap object, array of cards or tiles, or other objects used to link to the respective query results.

As described herein, an object creation service can be used to search and create objects within an editor or content-creation region of a graphical user interface. The system described herein can be used to facilitate creation of selectable graphical objects that can be inserted into the user's content without having to switch applications, browser tabs, or screens, in order to create the desired link. Furthermore, the selectable graphical objects may be created using data extracted from the linked content, which may give the user a more clear indication of the content being linked. For purposes of the following description, selectable graphical objects may include selectable tiles, buttons, or other similar graphical objects that include metadata or other data extracted from the target content or content provider. As described herein, selectable graphical objects may include a graphic or logo that corresponds to the remotely hosted content as well as select content obtained from the target content or content provider. In some cases, the selectable graphical object is depicted as a card displaying some portion of the metadata or other data extracted from the linked object. In other cases, the selectable graphical object may be depicted as an embedded object having an image, chart, video clip, or other graphical element extracted from the target content. Embedded objects may include content that is refreshed when loaded or at a regular interval in order to maintain current content. In some cases, the embedded objects include selectable elements that can be used to interact with the embedded content and/or functionality that is hosted by the content provider.

The embodiments and examples described here relate to systems and techniques for finding and linking objects and other content hosted by another platform or software application. As described herein, an object-creation service may be used to service requests from within an editor or other content-creation tool of a current platform or software application. The object-creation service may generate a window or other user-interface tool that can be used to find and select objects hosed by the other platform or software application. The object-selection window or other similar user-interface tool includes an expression editor that can be used to generate custom queries with respect to the other platform or software application. The expression editor may be evaluated in real time as an expression (full or partial), that is able to be evaluated, is being composed in the editor. The evaluated expression may be used to generate a structured query that can be used to search for objects or other content managed by the other platform or software application. In some implementations, the structured query is a multi-stage query that may be configured to execute compound queries, filtered queries, or other complex query operations. The structured query may be executed directly on a database of the other platform or software application. In other cases, the structured query is executed though an advanced programming interface (API) or other application interface. In implementations in which the results may include content having restrictive permissions, the interface may allow for an authenticated user to view content that satisfies a permissions criteria with respect to the authenticated user's profile or permissions scheme. Content for which the authenticated user does not have a least view permissions may be excluded from the results or the display of the results may be otherwise suppressed by the object-creation service.

Using the object-creation window, the user allows a user to view search results served by the separate platform without leaving the context of the current editor or content-creation user interface. As described herein, the object-creation window may include a query-results region that displays results returned by the query formulated in accordance with the text provided to the expression editor region, described above. The elements displayed in the query-results region may be automatically updated in response to changes to the text provided to the expression editor, which allows the user to modify and refine the query until the desired results are returned.

The object-creation window may also include an object-creation control, which may include a button or other selectable element. In response to a selection of the object-creation control, the service may be configured to generate a multi-element object within the user-generated content. As described herein, the multi-element object may include a table object, timeline object, project roadmap object, array of tile or card objects, or other type of object. The multi-element object may include one or more graphical selectable objects that, in response to a user selection, cause the system to redirect the user to the corresponding object hosted by the other platform or software application. In some implementations, the redirection causes the platform or software application to be invoked or accessed, switching the user from the context of the electronic document or page to the other platform/application. Once the other platform/application is active, the linked object may be displayed within the context of that platform/application. Alternatively, the linked object may be displayed in a floating window or other graphical object that is implemented from within the current platform or software application (e.g., from within the content collaboration platform).

The multi-element object may also include other content or data extracted from the linked objects. For example, the object title, creation data, author, project data, or other object-related data may be displayed within the table object or other multi-element object inserted into the electronic page or document. In some cases, the object-creation service may construct a full link path that specifies a target object or remotely hosted content item. As described herein, the full link path may be associated with a particular selectable graphical object that is rendered in the multi-element object inserted in the content-creation field.

Also as described in more detail herein, the selectable graphical object may have one of a number of different formats depending on the nature of the target object. A link-type selection control may also be provided, allowing the user to specify and/or change the type of selectable graphical object or link. Example selectable link types include a card or bar selectable object including a brief description of the target extracted from the target object; an embedded content selectable object having visual content that is extracted from the target object, or a provider-defined or user-defined selectable object having a combination of visual and descriptive elements, all or some of which are obtained from the target object.

The following examples are provided with respect to a collaboration platform, like a wiki documentation platform or issue tracking platform. However the following examples can be extended to a range of different content creation tools and can be applied to a range of applications having a content creation or editable content field in which the user is able to dynamically create digital content. Also, as described in the following examples, the link-insertion module may be invoked using one of a number of different techniques including a dedicated selectable control integrated with the graphical user interface of the client application, a plug-in control feature, a command-link control, or any number of other techniques that can be used to receive user input.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 depicts an example system 100 for generating selectable graphical objects with links to off-platform content and/or content provided by other aspects of a current platform. The system 100 may be used to quickly access third-party content, off-platform content or, in some cases, content from other pages or spaces within a current platform. In particular, systems and methods described herein with respect to system 100 and other examples relate to methods operating an object-creation service that is able to evaluate user-defined structured queries used to collect applicable objects managed by another platform or third-party service. In some cases, the system 100 may also be adapted to define links to sub-page or sub-document content.

As a result of the architectures and methods described herein, a user of a current software platform, such as a content collaboration platform, a documentation platform, a service desk platform, an issue tracking platform, or other content-creation platform, can more quickly access issue data from an issue tracking system, contact information, or other types of data hosted by another platform or service. As depicted in FIG. 1, the system 100 may include a client device 102 executing a client application that is configured to generate a graphical user interface 103. Using the techniques and systems described herein, accurate link creation may be performed from within the graphical user interface 103 of the client application without requiring the user to toggle or switch between applications, tabs, or screens, also referred to as "context switching."

As described herein, the graphical user interface 103 provided by the client application instantiated on the client device 102 may generate a graphical user interface that includes an editable region that is provided by a document editor, collaboration tool, or other content creation platform. The client application may be provided by a Web browser, dedicated application, or other similar software application that is configured to access content and develop new content for one or more content collaboration platforms 126 provided by the hosted platform services 120, also referred to herein as collaboration platform 126. As described herein, the client application 103, 113 may be configured to access the content store 128 of the hosted platform services 120 in order to provide the functionality related to one or more of the collaboration platform 126 supported by the hosted platform services 120. The collaboration platform 126 may include a documentation platform or content creation platform configured to allow for enterprise-wide content creation (e.g., Confluence™ from Atlassian™), an issue tracking platform configured to create and monitor tasks, issues, or tickets (e.g., Jira™ and Jira Service Management™ from Atlassian™), or other collaboration or content-creation platforms.

The hosted platform services 120 may include one or more authorization services 127 or authorization servers 127 that are used to authenticate system users (accessing the system through client devices 102, 110. Once authenticated, the users may be granted access to one or more of the respective software applications, platforms, and system content in accordance with a permissions scheme or profile stored with respect to each registered user account, which may be stored by or managed by a user profile database managed by the hosted platform services 120. The user profile database or data store may include a user role and a user permissions scheme, which may be used by the system to grant view, edit, share, and other similar permissions with respect to content managed by or accessible by the hosted platform services 120.

Each application may have a discrete or separate authorization service or system or applications may share or leverage a common authorization service or server. In one example, the hosted platform services 120 provides a unified authentication service by verifying access from a permitted user and pairing the verified user with a corresponding user account in one or more of the software platforms. As one non-limiting example, the authorization service or server 127 may use a shared cookie/scheme to authenticate each user account on each software application or platform. As another non-limiting example, the authorization service or server 127 may authenticate users with a single sign-on service (SSO) and/or a two-factor authentication (2FA) service. The authentication/authorization service or server 127 may authenticate a user based on user credentials, which may include a username or other user identification, password or pin, biometric data, or other user-identifying information. The user credentials may be stored and tracked using a token, authentication cookie, or other similar data element.

The collaboration platform 126 allows a user to create, edit, search, and/or view electronic documents, pages, or electronic content based on authentication and/or authorization of the user using the authentication/authorization service or server 127. Additionally, content displayed within a graphical selectable object within a page or document of the collaboration platform 126 may only be displayed in accordance with an authenticated user having permissions that allow at least view permission to the content that is linked via the graphical selectable object. In this way, the graphical selectable objects, having extracted data or embedded content, may not be used to circumvent the respective platform's permissions scheme. In some cases, a SSO service or other trusted or shared authentication scheme may be used to allow a separate service (e.g., an off-platform service or third-party service) to provide appropriate access to content having a restricted or specified permission scheme.

The hosted platform services 120 may also include a object-creation service 124 (also referred to herein as an object-discovery tool or link-creation service) that can be used to create custom selectable graphical objects without leaving the context or current view of the graphical user interface 103 of the client device 102. As described herein, the object-creation service 124 may cause the display of an object-creation window (also referred to herein as a link-creation window) or other interface that is overlaid or displayed within the visual context of the graphical user interface 103. The object-creation service 124 may include or be operably coupled to an expression evaluation service 123 that is configured to interpret text provided to the object-creation service 124 (via the object-creation window) and formulate a structured query that can be executed with respect to a data store or database of a separate platform or service (e.g., external platform services 130). The external platform services 130 may be associated with a separate or third-party platform that hosts content including documents, images, audio and/or video content, contacts, project management content, issue or ticket content, or other content that is hosted remote to the hosted platform services 120 using a distinct application or cloud-based interface.

The object-creation service 124, as described with respect to the various examples herein, generates a dynamic interface that includes items or elements that are generated in response to a series of API calls or other structured queries to the external platform services 130. Specifically, the object-creation service 124 may cause the display of a floating window that includes an expression editor region and a query-results region that includes a list of elements or items that correspond to data objects that satisfy an expression entered into the expression editor region. As the user enters text into the expression editor region, the expression evaluation service 123 alone or in conjunction with a query gateway 125 generates or formulates structured queries that can be served to the external platform service 130. The query may return a list of data objects or data associated with data objects managed by the external platform service 130 that satisfy the query. Based on the data obtained from the external platform service 130, the object-creation service 124 may generate a list of elements that correspond to the hosted content or items that are available. In some cases, the elements displayed by the object-creation service 124 are listed on separate tabs, each tab associated with a different content provider. By navigating through the displayed tabs and elements of the floating window interface, the user can dynamically create a selectable graphical object for insertion in a content-creation field of the graphical user interface 103.

Repeated queries may be executed in order to automatically update the displayed items in response to either changing data provided by the external platform service 130 or in response to changes to the text in the expression editor region or other field used by the object-creation service used to generate the query. In some cases, the queries are repeated in 100 ms or less intervals. In some cases, the queries are repeated in 500 ms or less intervals. In some cases, the queries are repeated in 1000 ms or less intervals. The query interval may also be dependent on estimated editing activity (e.g., approximate editing frequency) of the query expression in the expression editor region.

The object-creation service 124 includes an expression evaluation service 123 that interprets text entered into the floating window or other similar interface in order to generate a structured query that can be executed or served to an external data store managed by the external platform services 130. A structured query may be a query formulated in accordance with a predefined schema that is configured to extract data from a relational database or other similar data store. The structured query may be defined in accordance with a standardized language or schema including, without limitation, Structured Query Language (SQL), Jira Query Language (JQL), GraphQL, MongoDB, and gRPC query protocols.

As described herein, the expression evaluation service 123 may be specially adapted to handle queries for platform-specific data like issue queries for an issue tracking system. Specifically, the expression evaluation service 123 may be adapted to formulate JQL queries based on a text expression entered into the expression editor region or other field of the object-creation interface. The expression evaluation service 123 may operate an expression editor within the respective region of the interface, which provides default structure and template text, which can be used to facilitate the creation of custom, user-defined query expressions. In some cases, the expression evaluation service 123 is configured to evaluate partially completed expressions as they are entered by the user and/or suggest text for completing the partial query. The expression evaluation service 123 may be adapted to convert user input into a structured query defining a field, operator, keyword, and/or value. The field may be used to specify a field of an issue object, such as an issue title, issue assignee, issue reporter, project/epic name, service desk, or other issue-specific attribute. Operators may include logical operators including, equals, does not equal, greater than, less than, greater than or equal to, and other similar logical operators. The keyword may include logical keywords or elements including, without limitation, AND, OR, NOR, NAND, IS and other keywords.

As shown in FIG. 1, the object-creation service 124 includes a query gateway 125, which may be configured to handle or serve queries formulated by the expression evaluation service 123. While depicted as a separate element in FIG. 1, the operations of the expression evaluation service 123 and the query gateway 125 may be integrated into a single service or set of operations. Furthermore, in some implementations, the expression evaluation service 123 may include an instantiation of the external platform service 130, which allows for direct execution of structured queries without a query gateway 125 or service. In the case in which the external platform service 130 is an issue tracking platform, an instance of the issue tracking platform may be instantiated and operably coupled to the object-creation service 124 for receiving structured queries directly from the expression evaluation service 123 or even from a plain-text input field in which the user can author expressions without the assistance of an expression evaluation service 123.

In general, the query gateway 125 may be adapted to formulate an advanced programming interface (API) call with respect to the external platform service 130 in order to execute the structured query. In some implementations one or more content providers associated with an external platform service 130 are registered with the query gateway 125 of the object-creation service 124 or some other aspect of the hosted services 120. In one example, the object-creation service 124 is able to access a provider registry that includes a listing of content providers that are compatible with the operation of the object-creation service 124. Typically, a registered content provider will provide one or more target paths to the external platform service along with a set of application programming interface (API) commands or other structured query schema that are compatible with the external platform service 130. The provider registry may store or provide access to both the link paths and a library of API or other structured query commands. The API commands may include traditional REST API commands or other structured programming interface schema. For example, the query gateway 125 may be configured to adapt the query formulated by the expression evaluation service 123 into a schema compatible with the external platform service 130, which may include GraphQL, Sequel Query Language (SQL), Jira Query Language (JQL) or other structured programming interface schema. The provider registry may include a resolver or command interpreter module that is configured to translate or adapt requests from the object-creation service 124 into an API call that is supported by the external platform service 130. As shown in FIG. 1, the external platform service 130 typically includes a corresponding API gateway or module 132 that is configured to service the API calls made by or on behalf of the object-creation service 124.

The hosted platform services 120 also includes node services 129 that allow for linking between document nodes across pages or documents of the content collaboration platform 126. The node services 129 may be interfaced with events generated in the content collaboration platform 126 including link creation commands and/or content-creation commands that designate portions of a page or document as pages, as snippets, or nodes. As described in more detail below with respect to FIGS. 6-7B, for designated portions of a document or page, the node services 129 may be configured to assign a universally unique identifier to the corresponding portion of a document or page referred to herein as document snippets or nodes. The node services 129 may utilize an internal registry, an object graph data structure, or other technique to track usage and changes to node content associated with registered nodes or snippets. With a reference to the appropriate content type and the universally unique identifier, documents or pages may link to nodes or snippets in a source document through the node services 129. As described in more detail below with respect to FIGS. 6, 7A, and 7B, the node services 129 may include a node provider and a modification handler that allow a document created in a first or source document to be inserted via a link into a second or target document.

The node services 129 may ensure that registered nodes or snippets are synchronized across documents or pages that include registered nodes or snippets within the respective user-generated content. In some implementations, as the original or source node is modified in the source document, the changes are propagated to other documents that include a linked or target node. In some implementations, the updates may be performed both ways such that updates performed in the other documents may be propagated from the linked or target nodes back to the original or source node in the source document. The universally unique identifier and content types stored in the document structure of the user-generated content (stored in, for example, the content store 128) enable the node services 129 to track usage and modifications to the node content and enable cross document synchronization.

Similarly, the node services 129 may enable content synchronization between content provided by platform services 136 and corresponding nodes, snippets, or other objects created in documents of the content collaboration platform 126. By way of example, the node services 129 may detect user input or user modifications to linked content that is reproduced from the platform services 136 via a selectable graphical object or multi-element object (e.g., a table or list) and propagate that input or modification back to the source content managed by the platform services 136. As shown in FIG. 1, the node services 129 may access the platform services through an API gateway 132 and may be configured to pass along user credentials or an authentication token to the authorization manager 134 in order to effectuate the changes to the content managed by the platform services 136. As described in more detail with respect to FIGS. 8A-8B, the node services 129 or other similar services may be used to receive user input to a linked object (e.g., a table object of issues) to update issue data managed by an issue tracking platform or application (example platform services 136). The node services 129 may also help to ensure content obtained from external platform services 136 is synchronized across documents and pages managed by the content collaboration platform 126.

In addition to or as an alternative to the object-creation service 124 and the node service 129, the hosted platform services 120 may also include a hierarchical path interpreter module 122 (also referred to herein as an in-line link creation module, hierarchical path interpreter, or path interpreter module) that is configured to assist the user, through the graphical user interface 103 of the client device 102, in the creation of selectable graphical objects without leaving the context of the graphical user interface 103 of the client application. Generally speaking, the hierarchical path interpreter module 122 can also facilitate the creation of a selectable graphical object or link within a content-creation field similar to the object-creation service 124, discussed above. One difference is that the hierarchical path interpreter module 122 is directed by text or other input provided in-line or directly within the content-creation field (rather than through a text entry field of a separate floating window interface). However, depending on the implementation, the operations and functionality of the hierarchical path interpreter module 122 and the object-creation service 124 may be combined or may operate in concert with each other in order to create selectable graphical objects without switching context away from the graphical user interface 103.

In general, the hierarchical path interpreter module 122 is able to monitor text or command line input from the user (input via the graphical user interface) and interpret partial path or partial command input in order to formulate API calls to an API gateway or module 132 of an external platform services 130 in order to assist and guide the user in completion of the link or path. Similar to the object-creation service 124, the hierarchical path interpreter module 122 is adapted to provide an accurate and dynamic view of the content items provided by a service provider of the external platform services 130. In some cases, the hierarchical path interpreter module 122 is able to interpret and execute structured queries, with the assistance of the expression evaluation service 123 or another similar service provided by the hosted services 120.

The hierarchical path interpreter module 122 is configured to receive and analyze partial text entries as the user types them into an editable field or region of the graphical user interface 103. The analysis performed by the link creation module may occur in response to the entry of a command-line character or symbol that designates the textual input as a link insertion command. In some cases, the command-line character, such as a forward slash "/" or a forward slash with one or more designated characters "/L", may be interpreted by the system as a link insertion command. In response to determining that a link insertion command has been entered, the link creation module may begin to analyze partial textual entries as the user enters the textual input. The hierarchical path interpreter module 122 may perform textual analysis on the partial textual entries in order to identify a target content source. In the example of FIG. 1, the target content source may be associated with a hosted service 136 offered by the external platform services 130. In some cases, the hosted service 136 may also be accessible by a URL or other address or path.

In response to identifying the target content source, the hierarchical path interpreter module 122 may formulate one or more structured queries to the API gateway 132 of the external platform services 130. The structured queries may be specific to the external platform services 130 and, in some implementations, may be determined by the link insertion command, which may indicate a class of target sources to be accessed, which may correlate to a particular query schema or set of predetermined schema. The structured queries generated by the hierarchical path interpreter module 122 may be serviced by the API gateway 132 of the external platform services 130.

As shown in FIG. 1, the API gateway 132 may utilize a number of modules and services hosted by the external platform services 130 in order to respond to calls made by the object-creation service 124 or the hierarchical path interpreter module 122. In some cases, the API gateway 132 may authenticate the user and/or the request using the authorization manager 134. In some cases, the API calls include user account information received from the client device 102 that is used by the authorization manager 134 to authenticate the user and allow access to the content store 138 and/or the hosted services 136. The authorization manager 134 may issue a token or other authentication credential that can be used by the object-creation service 124 or the hierarchical path interpreter module 122 to access data and services on the external platform services 130. In some implementations, all data and service requests are routed through the authorization manager 134 to ensure that the API calls are originated from an authenticated source.

In many cases, the user of the client device 102 may need to create an account or register with the external platform services 130 in advance of the link creation operations described herein. In some instances, the client device 102 utilizes a multi-factor authentication as defined by or in accordance with security protocols defined by the external platform services 130. The authentication may also be performed as part of a single-sign on (SSO) or other broadly implemented security protocol, which may be used to authenticate the user of the client device 102 in advance of the link creation operations.

The data and services that are provided by the external platform services may be restricted to users having a registered account (authenticated using one of the techniques described above) and having an appropriate set of permissions, which may be defined by the type of registered account or user-specific access protocols. Generally, for purposes of the following examples, the user may have at least "view" or "read" permission for content displayed or accessible using the link creation tools described herein. Users without an account and/or without the appropriate set of permissions may not be able to use the link-creation techniques to access data that would otherwise be restricted from viewing by that user. Additionally, there may be portions of the content and/or services provided by the external platform services 130 that are available to the public and do not require authentication or a special set of permissions in order to access or view.

With respect to FIG. 1, in response to one or more of the API calls made through the API gateway 132, the object-creation service 124 and/or the hierarchical path interpreter module 122 may receive host data. The host data may be interpreted by the object-creation service 124 and/or the hierarchical path interpreter module 122 in order to generate one or more visual prompts that are displayed in the graphical user interface 103 in order to prompt or suggest additional input from the user. In some cases, the visual prompts include in-line text that is displayed ahead of the cursor position of the graphical user interface, which may suggest to the user a predicted completion of a portion of the link which, in some cases, may include a completion of the link or a final target. In some cases, the visual prompts include a series of selectable options that are presented in a floating window or other graphical element in the graphical user interface 103. In response to the prompts, the user may enter additional textual input either through a keyboard or by selecting one of the visual prompts. This process of interpreting a partial input, calling the external platform services 130 using one or more API calls and displaying prompts, may be repeated multiple times until the complete link path or final target is specified in the command line.

As described herein, once a target is specified, the system may use the retrieved hosted data to create a selectable graphical object that is inserted in the content-creation field and, in some cases, replaces the textual input (if using an in-line link creation technique). The hosted data, obtained using an application program interface, may include additional link path data or target content data, which may be used to complete the link path of the textual input. The selectable graphical object may include a card or tile that includes information identifying the target content source and may include key information obtained from the hosted data. In accordance with the examples provided herein, the link may include an object name, object summary, object state, author, last edited, and other object data stored in the content store 138 of the external platform services 130. In accordance with the examples provided herein, the object data may be issue data extracted from an issue or issue object managed by an issue tracking platform or service. Also as described herein, if the hosted data corresponds to multiple items or entries, the selectable graphical object may be presented as a table of items having hosted data displayed in appropriate cells of the table. If the target corresponds to a multimedia item or other similar content, the selectable graphical object may include an embedded link that includes an image, graphic, GIF, or other content that is displayed within the selectable graphical object.

The object-creation service 124 or the hierarchical path interpreter module 122 may also be adapted to interpret a portion of the path text as a format or display command associated with a particular format. For example, a format command may be designated through a period "." or other symbol that can be used to delineate an in-line formatting command. The format or display command may be used to designate whether the hosted data is presented as a card, phone number, name, or other single line format. The format or display command may also specify a table display format, embedded media display format, or other type of format as can be specified by the user. In some cases, the link-discovery service 124 or the hierarchical path interpreter module 122 automatically detects or determines a type of hosted data and constructs a default format or display command as part of the complete path or line command.

As depicted in FIG. 1, the content available through the external platform services 130 may also be provided through a separate graphical user interface 113 provided by a client application instantiated or executing on the client device 110. In this example, the separate graphical user interface 113 is depicted as being executed on a separate client device for purposes of illustration. However, the graphical user interface 113 may also be executed on the same client device 102, which is providing the other graphical user interface 103. The two graphical user interfaces 103, 113 may be provided by two separate applications or may be provided in different tabs of a shared application, like a browser or other similar application.

The techniques described herein allow the user access and search content that may otherwise be available using the separate graphical user interface 113, but without having to leave the graphical user interface 103. As discussed above, these techniques may allow the user to find, view, and insert content related to third-party content without having to leave a current UI or context, which improves the speed of content creation and improves computing efficiency by reducing the number of user interfaces that need to be generated and may reduce the amount of data that is transmitted over a network in order to find content and create a link or selectable graphical object within the content.

As shown in FIG. 1, the system 100 includes external platform services 130 that is adapted to provide content for third-party services and content. The content may be rendered, viewed, and otherwise accessible through the graphical user interface 113. The external platform services 130 includes an authorization manager 134, which is adapted to authenticate users and transactions in order to maintain secure storage and access to the platform services 136 and the associated content store 138. The authorization manager 134 is adapted to authenticate users either through entry of credentials (e.g., a username and password) through the graphical user interface 113 or through a secure token or other similar credential. Token authorization or other similar authorization techniques may be used by the hierarchical path interpreter module 122 and/or the object-creation service 124 in order to access data stored by the content store 138 and/or services provided by the hosted platform services 136.

As described above, the object-creation service 124 and/or the hierarchical path interpreter module 122 may be able to access data and services from the external platform services 130 using a series of API calls, which may be defined by the external platform services 130. In some cases, the external platform services 130 provides a variety of REST API, GraphQL, SQL, JQL, or other API-accessible resources that enable searching and retrieval of data stored in the content store 138. As an example, the API gateway 132 may be adapted to service query resources that return a single result, a set of results, path information, partial path information, and/or information about the organizational structure of the data accessible on the content store 138.

The external platform services 130 may, in some cases, provide cloud-based document storage or other web-enabled service. The external platform service 130 may include a documentation or content collaboration platform (e.g., Confluence™ offered by Atlassian™), an issue tracking platform (e.g., Jira or Jira Service Management™ offered by Atlassian™), a project management platform, a cloud-based document storage platform (e.g., Google Drive™, Dropbox™, or Box™), video or audio media platform (e.g., YouTube™ or Spotify™) or other network-enabled service or content provider. The external platform services 130 may, in some cases, provide a customer-resource management (CRM) system that is adapted to store sales leads, sales contacts, contact information, customer directories, workflow information, and other data associated with the CRM system. An example CRM system may be Salesforce.com, Monday.com, Insightly.com and other customer-resource or relationship management tools. A typical CRM may enable a sales team to track engagements with key customers or contacts and manage a sales pipeline, develop marketing analytics, and provide other services for a sales or marketing team. While a CRM is used as an example throughout the specification, similar or the same techniques may be applied to a wide range of other systems and platforms. Furthermore, while some of the examples described herein rely on the use of third-party APIs, other implementations may use other techniques to access metadata or other information retrievable via a URL or other network-addressable locations.

FIG. 1 depicts an example system 100 having multiple computing devices operably coupled by a computer network 101. As shown in FIG. 1, the system includes client devices 102 and 110. The client devices 102, 110 can be any suitable electronic device; examples include a desktop or laptop computing device. In other examples, the client devices 102, 110 may be a mobile device such as a tablet or a cellular phone. It may be appreciated that these example electronic devices are not exhaustive; any suitable device may be a client device as described herein.

The client devices 102, 110 may each include a processor and a memory. The processor may be any suitable computing device or logical circuit configured to execute one or more instructions to perform or coordinate one or more operations on or to digital data. In many embodiments, the processor or processors of the client devices 102, 110 may be a physical processor, although this is not required of all embodiments; virtual components may be suitable in some implementations. Similarly, a memory of the client device 100 may be configured and/or implemented in a number of suitable ways and may be partially or completely virtualized.

In typical examples, the processor of the client devices 102, 110 is configured to access at least one executable asset from the memory of the client devices 102, 110. More particularly, the processor of the client devices 102, 110 may be configured to access a data store portion of the memory to load, into a working portion of the memory, at least one executable asset or executable program instruction. In response to loading the instruction or executable asset into working memory, the processor of the client devices 102, 110 may instantiate an instance of software referred to herein as a client application.

In many embodiments, a client application (also referred to as a "frontend") may be configured to provide client-side functionality of a software platform (a documentation or content creation service or other collaboration platform). More specifically, the client application may be configured to communicably couple to a separate instance of software executing on, and/or instantiated by, a host system or server configured to provide server-side ("backend") functionality of the hosted platform services 120 (e.g., documentation or content creation service). In this manner, a documentation or content creation service is defined in part by a frontend executing/instantiated on a client device and in part by a backend executing/instantiated on a host server of the platform services 120 in communication with the frontend.

In this example, the hosted platform services 120 and external platform services 130 include a host server supporting the backend configured to operate within, or as, a virtual computing environment that is supported by one or more physical servers including one or more hardware resources such as, but not limited to (or requiring) one or more of: a processor allocation; a memory allocation (also referred to as a working memory); non-volatile storage (also referred to as persistent memory); networking connections; and the like.

Further, it may be appreciated that although referred to as a singular "server", a host server supporting the backend may be a cluster of different computing resources, which may be geographically separated from one another. In this manner, because specific implementations may vary, both the host server (of the hosted platform services 120 and external platform services 130) and the client device 102 can be referred to, simply, as "computing resources" configured to execute purpose-configured software (e.g., the frontend and the backend).

As used herein, the general term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices and systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

An example implementation of the system 100 of FIG. 1 is described below with respect to FIGS. 2A-8B. While the following screen shots and examples are provided as an illustration of the principles of this disclosure, the examples are not intended to be limiting in nature and merely serve to demonstrate the use of the proposed systems and techniques.

Figure 2A:
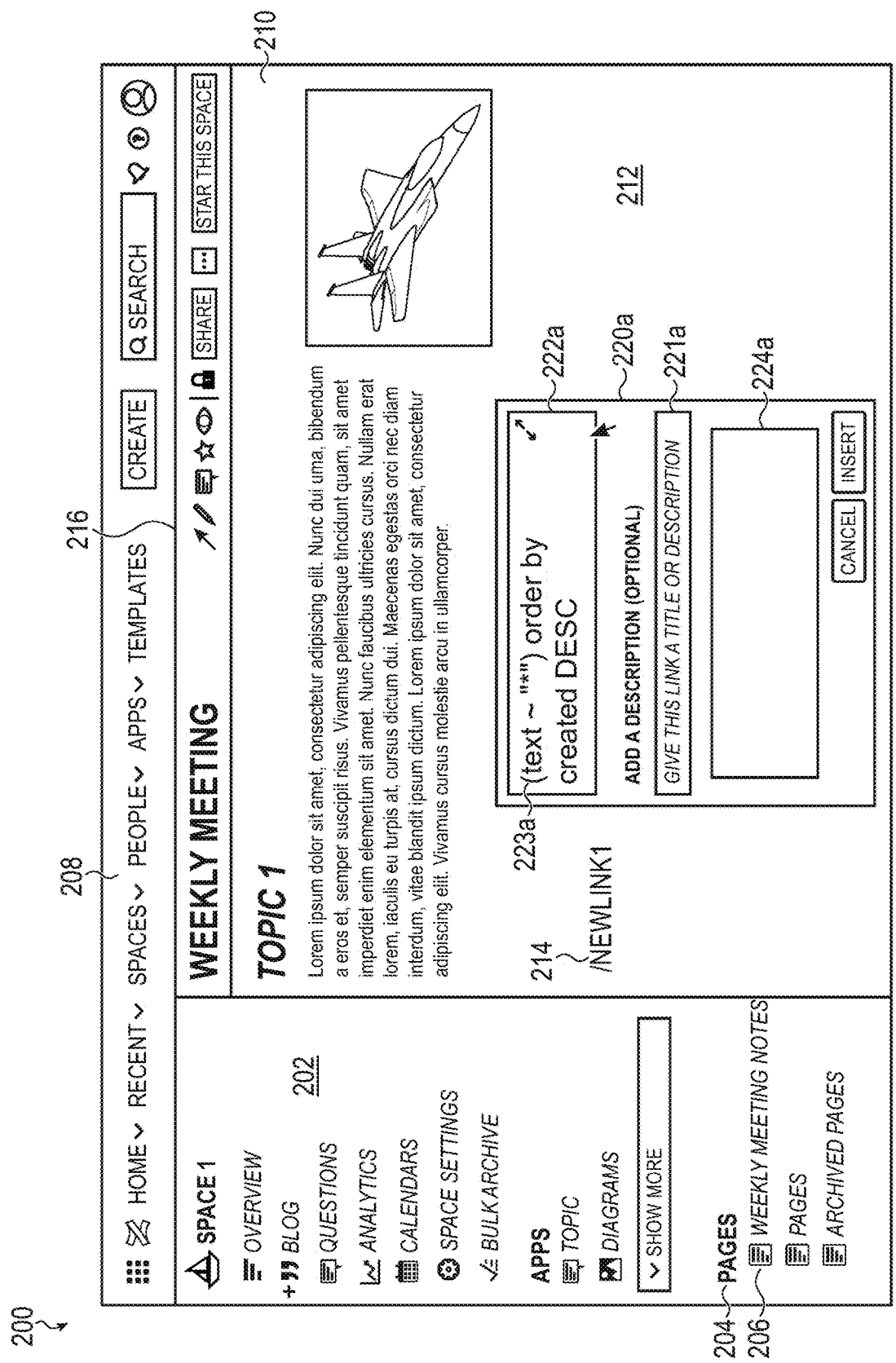
FIG. 2A depicts an example object-creation window in a content-creation region.

FIG. 2A depicts an example object-creation window in a content-creation region of a graphical user interface. In particular, FIG. 2A depicts a graphical user interface 200 produced by a content collaboration application that may be instantiated on a client device. The content collaboration platform may be a documentation platform or other software application used to produce electronic documents or pages with user-generated content. The user-generated content may include one or more graphical selectable objects generated in accordance with the present disclosure.

As shown in FIG. 2A, the graphical user interface 200 is produced by a client application or frontend application executed on a client device or terminal. The client application or frontend application may be instantiated or executed on the client device through either a dedicated client application or a web-based browser or other similar application that is configured to access a portal of a first-party platform via a URL or other addressable network path. The graphical user interface 200 may be generated in accordance with a JavaScript or other web-enabled protocol that is produced by a backend application operating on a host server or host services.

As shown in FIG. 2A, the graphical user interface 200 includes a content-creation region 210 that is configured to receive user content that may include text, images, videos, links, and other user-generated content 212. Generally, the content-creation region 210 includes an editor service that accepts textual input from the user via a keyboard or other similar input device. The graphical user interface 200 may also include a navigation region or panel 202 that includes items that are selectable to cause navigation between pages, documents, and document groupings or spaces. In the present example, the navigation region 202 includes a hierarchical element tree 204, also referred to as a page tree or document tree. The hierarchical element tree 204 includes hierarchically arranged elements 206, which correspond to pages or documents that are associated with the given workspace or space. The elements 206 are selectable to cause display of the corresponding page content or document content (example user-generated content 212) within the content-creation region 210.

In the present example, the graphical user interface 200 is in an edit- or document-creation mode such that the right-hand region is operable as a content-creation region 210. The graphical user interface 200 may also be operated in a document view or reader mode in which the right hand region displays the user-generated content 212 but disables at least some edit functionality. When in the document view or reader mode, the graphical user interface 200 may allow for some content-creation or editing operations, such as the creation or modification of in-line comments, tags, labels, or other similar content. The graphical user interface 200 may be toggled between edit and view mode using controls available on the control bar 208. Other navigational tools, editing tools, menus, or other controls may be provided by the control bar 208.

The graphical user interface 200 depicts an example link-creation window 220a (also referred to herein as an object-creation window), which can be used to create a selectable graphical object or multi-element object within the content creation region 210 of the graphical user interface 200. Invocation of the object-creation service (also referred to herein as an object-discovery tool or link-creation service) may cause the display of a link-creation window 220a that overlays or overlaps some portion of the content-creation region 210. This window 220a may also be called a floating window or popup user interface element. The selectable graphical object or multi-element object may be stored as part of the electronic document or page and accessed by authorized users of the content collaboration system.

In the example of FIG. 2A, the link-creation window 220a includes an expression editor region 222a. The link-creation window 220a also includes a list of elements in a corresponding field 224a. The query results region 224a is configured to display a set or list of results produced in response to an evaluation of a query generated using the expression editor region 222a. The link-creation window 220a also includes a label field 221a that can be used to enter custom descriptive text to be displayed in the selectable graphical object to be created using the link-creation window 220a.

As shown in FIG. 2A, the expression editor region 222a defines an editable field that is configured to receive user input (e.g., text input). The expression editor region 222a is configured to evaluate the user input and produce a structured query that can be executed on a respective platform or data store. As described previously, the structured query may be in accordance with a number of different protocols or query schema including, for example, SQL, JQL, GraphQL, MongoDB, or gRPC query protocols. In the current example, the expression editor region 222a is configured to construct a JQL query also referred to herein as a structured issue query that may be executed on an issue tracking system or platform. The expression editor region 222a may provide syntax assistance to the user by providing automatic or suggested corrections, autocompletion, or other assistance to the user. In some cases, the expression editor region 222a includes a command bar or menu control that allows the user to select predefined query expressions, clauses, or other elements. The expression editor region 222a may also be configured to evaluate partial entries and automatically execute or cause execution of queries in response to an expression being entered that is able to be evaluated or rendered, even if the expression is able to be further modified or is in the process of being edited. As shown in the subsequent figures (e.g., FIGS. 2B-2D), this allows the user to view search results in real time so that the expression can be modified or edited in order to achieve the desired results.

As shown in FIG. 2A, in the expression editor region 222a, the editable field includes a suggested or template query string 223a that outlines a starting query expression. The initial query string 223a may be generated in response to a command line argument or menu selection used to invoke the object-creation service or tool. In some cases, the initial query string 223a may be generated in accordance with previous searches conducted by the user, prior user activity on the system, a user role, or other characteristic of the user. In some cases, the initial query string 223a may depend on the session context including the document space, applications currently running and/or content extracted from the current page or document. The initial query string 223a may include some text or characters having an appearance that is visually distinct from other characters indicating which text should be edited or customized by the user. However, in many implementations, all of the text of the initial query string 223a is editable or customizable by the user and the expression editor region 222a may be used to generate a broad range of query types supported by the protocol or target platform. In some cases, compound queries and/or multi-stage queries may be generated in which the results of a clause or sub-query may be used as an argument or portion of another clause or sub-query. The query may also include any number of filters, ordering commands, or other arguments that can be used to reduce the results and define a ranking or order of the results.

The link-creation window 220a may be displayed in response to one or more inputs that invoke the object-creation service. In this example, the link-creation window 220a is rendered in response to a user selection of a link-creation control 216 located in the toolbar 208 or other region of the graphical user interface 200. The link-creation window 220a may also be rendered or displayed in response to a command line 214 or other text entered into the content-creation region 210. The command line may include a command character ("I"), which may be used to designate the first portion of the textual input as a link-insertion command. Additional command characters may include, without limitation, "@," "\\," ">," or other characters alone or in combination with additional characters. For purposes of this disclosure, the term "character" may be used to refer to alpha-numeric characters, symbols, glyphs, and other elements that may be provided using a user-input device like a keyboard, touch screen, or other similar device. The command line may also include a main command portion, which can be used to designate the module to be invoked, and one or more command argument portions, which can be used to designate options associated with the module being invoked. For example, the command line may include the text "/linksearch-confluence-jira," which may invoke the object-creation service and the display of the link-creation window. The optional arguments, "confluence" and "jira", may be used to designate that the window should include tabs for content provided by the Confluence and Jira platforms.

In general, object-discovery service may be adapted to communicate with an external platform or content provider accessible over a computer network using a query gateway, as described above with respect to FIG. 1. In some cases, the content providers may include a multi-tenant software platform that is accessible via a URL or other addressable network location. As described above with respect to FIG. 1, the content providers may have a dedicated interface or portal that provides traditional access to the content items or objects stored on the platform. The current technique may be used to replicate or simulate some of the navigational controls provided by the particular platform but in a way that is normalized or unified through the object-creation service interface. Importantly, the proposed technique may allow the user to provide user-defined expressions that can be used to formulate a query or set of queries to be executed on the external platform or content provider without having to navigate away from the graphical user interface 200. In some implementations, each of the content providers used with the object-creation service is registered with the service. Registration of the content providers may be maintained in a provider registry accessible by or incorporated in the object-creation service. The provider registry may include a list of content providers, link paths, or other addressable network locations, and a set of qualified application programming interface commands or query schema that can be used to access hosted data (e.g., metadata and/or content) stored at the respective content provider. In some cases, the provider registry serves as an abstraction layer by mapping user selections and other input received by the link-creation window into API calls or queries that can be serviced by an appropriate gateway of the content provider. For purposes of the examples described herein, the term API or API call may be used to refer to a broad range of structured calls or queries including traditional REST API commands, Graph QL commands, Sequel Query Language (SQL), Jira Query Language (JQL) or other similar techniques.

FIGS. 2B-2E depict example portions of the interface of FIG. 2A in various states and operations. The surrounding interface elements shown in FIG. 2A are omitted from this series of examples for clarity and to reduce redundancy within the figure set. It is intended that each of the examples of FIGS. 2B-2E can be performed within the context of the graphical user interface 200 of FIG. 2A.

Figure 2B:
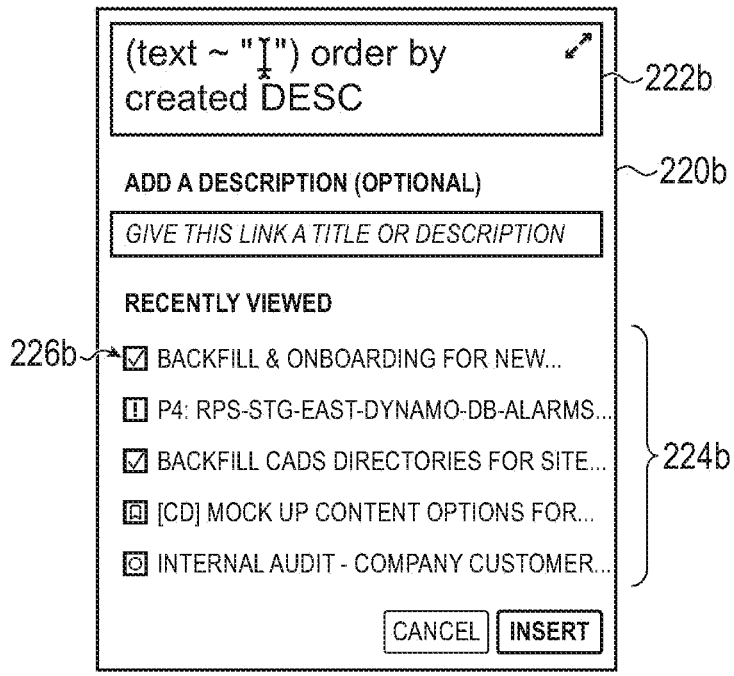
FIGS. 2B-2E depict an example object-creation sequence for generating a table or other multi-element object within user-generated content.

FIG. 2B depicts an example state of the link-creation window 220b. Specifically, the link-creation window 220b may represent a state of the window before text entered into the expression editor region 222b has been evaluated or before text has been entered into the expression editor region 222b. As shown in FIG. 2B, the link-creation window 220b includes a query results region 224b which is populated with recently viewed or recently accessed elements 226b. A reference to elements 226b may be stored from a previous session or user interaction. In some cases, the current platform (the content collaboration platform) or the separate platform may maintain a log or list of recently viewed items that can be sorted or accessed by a user account. This allows for the user to select from a list of previously accessed or viewed items without having to perform a query, which may reduce system load and improve performance of the service. In some implementations, the display of the elements 226b may be maintained or persist until the user interacts with the expression editor region 222b by, for example, placing a cursor or selecting within the expression editor region 222b.

Figure 2C:
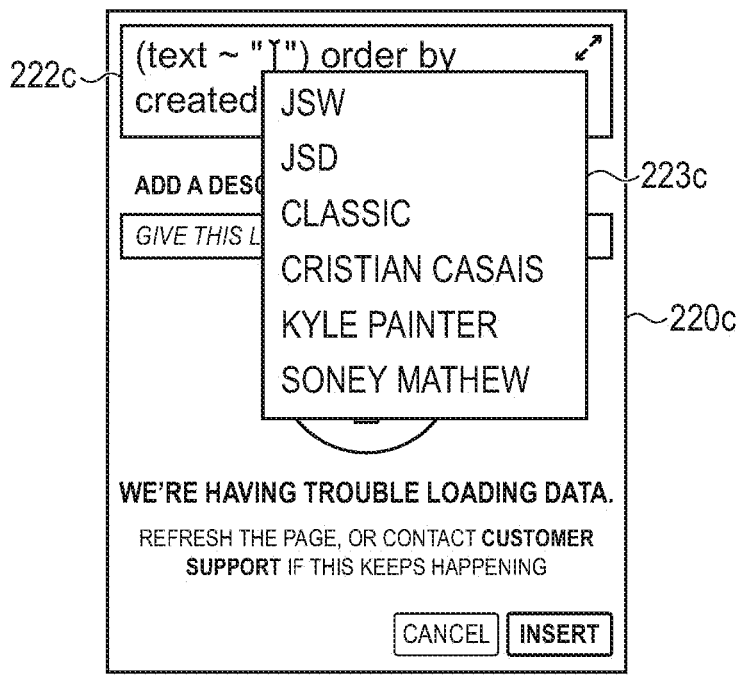

FIG. 2C depicts a state of the link-creation window 220c in which the user is interacting with the expression editor region 222c. Specifically, as shown in FIG. 2C, the user has begun to enter text or has made a user selection within the expression editor region 222c which automatically invokes functionality of the expression evaluation service. In this particular example, the user has placed a cursor or made a selection proximate to the placeholder or wildcard element within the expression text depicted in the expression editor region 222c. In response, the expression evaluation service causes display of a floating window or floating menu 223c. The floating menu 223c include a list of values or selectable text that may be inserted into the expression in response to a user input. The list of values or selectable text may be based on recently entered text, previously drafted queries, or may be otherwise associated with a previous user session. In some cases, the list of values or selectable text is determined based on the user-generated content of the current page or electronic document being drafted. In some cases, the list is determined based on keywords associated with a current project or team associated with the authenticated user.

Figure 2D:
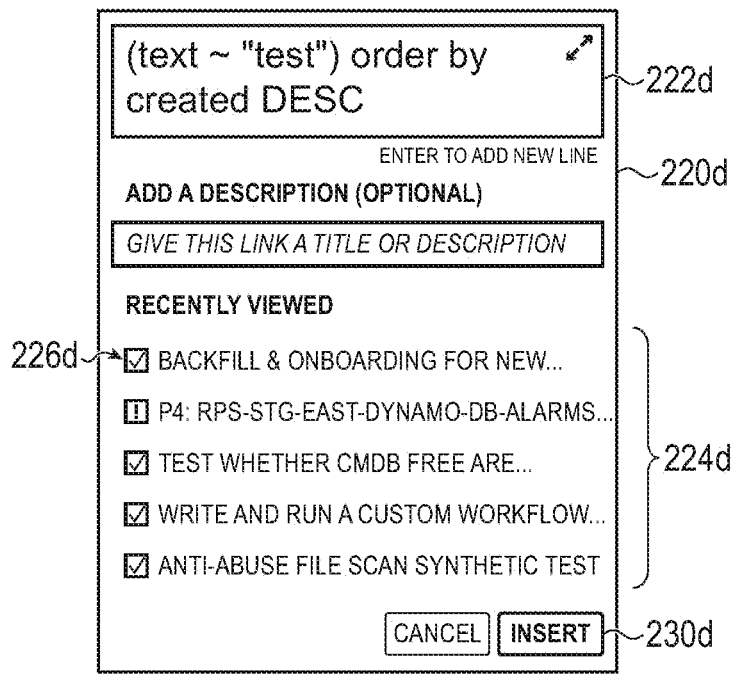

FIG. 2D depicts the link-creation window 220d in a state in which the expression or text entered into the expression editor region 222d has been evaluated and used to produce a set of results 226d displayed in the query-results region 224d. In particular, the expression editor region 222d is operably linked to an expression evaluation service (e.g., expression evaluation service 123 of FIG. 1) and uses the text entered (or preloaded) into the field to define a structured query, which may have been executed on a data store of an issue tracking system using an API or other interface. In some implementations, the object-discovery tool instantiates an issue tracking system or service associated with the issue tracking system that provides access to issue objects or other stored objects of the issue tracking system without the user of an API. In some cases, the expression editor region 222d (via an expression evaluation service) is configured to interact directly with the issue tracking system. In other cases, the expression editor region 222d or expression evaluation service is operably coupled to a query gateway or other similar service that is able to execute the structured query on the issue tracking platform using a REST API or other supported protocol over the internet or other network interface. An example query gateway 125 is depicted in FIG. 1, described above.

As shown in FIG. 2D, the query-results region 224d includes a set of results 226d, which are generated in response to the query formulated using the expression editor region 222d. In the present example, the set of results 226d includes a list of elements that each corresponds to an issue or issue object tracked by the issue tracking system. The set of results 226d includes one or more fields, properties, or attributes that match the query (including any search terms, filters, or other criteria) specified in the query-results region 224d. Each of the displayed elements may include object data, which may include or be restricted to metadata, associated with each object. The object data (e.g., metadata) may be extracted from the objects stored by the external platform or may be provided by an index or object registry maintained by the external platform.

Figure 4A:
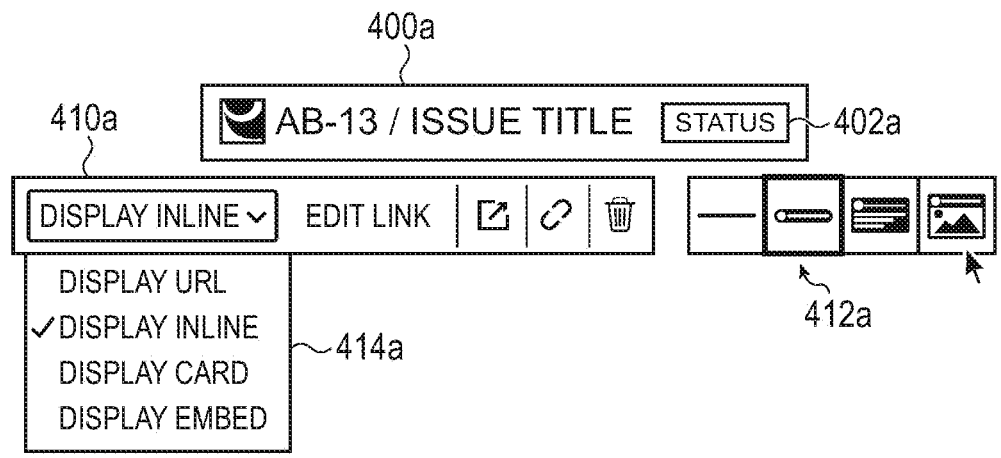
FIG. 4A depicts an example graphical selectable object created using the techniques described herein.

Each of the elements may be selectable for insertion as a selectable graphical object within the content-creation region and stored as part of the user-generated content of the corresponding page or electronic document. An example selectable graphical object is depicted in FIG. 4A of the present disclosure. In some cases, the entire set or a subset of the results may be selected in order to generate a multi-element object within the content-creation region. Examples of the multi-element objects that may be created using the object-discovery service or tool are depicted in FIGS. 4B-4E of the present disclosure.

In some cases, the particular issue tracking system that is queried is specified by a registry of the hosted services or may be determined based on the context of the current session. In some cases, the content collaboration platform and the issue tracking platform are managed by a common platform service provider that has licensed the services to a common tenant or organization. The platform service provider may use a cross-platform registry or account lookup to cross-reference user accounts and/or tenant accounts. In some implementations, user credentials associated with the user of the content collaboration system are used to authenticate the user with respect to the issue tracking platform. In other implementations, the user may be prompted or be required to enter credentials that are specific to the issue tracking system before results can be shown or before a query can be executed. As described previously, a common or trusted authentication scheme like a Single Sign On (SSO) service may also be used to authenticate the user across platforms for a given session.

Frequently, the content available on either or both platforms is governed by a permissions scheme that allows read, write, share, administrator, and other permission levels with respect to the content or system objects provided by each of the systems. Each user account may have a corresponding permissions scheme or profile that defines the level of access granted to the particular user account. The permissions associated with a user account may be defined by user role, user group, site license, and/or may be customized by a user to provide access to content necessary to perform the work on the system. With regard to the current system, only results 226d that have at least view permissions with respect to the authenticated user may be displayed within the query-results region 224d or other interface of the system. Search results, objects, or other object data for which the authenticated user does not have at least view permissions may be omitted or suppressed from display. In this way, the object-discovery tool and resulting objects cannot be used to circumvent an existing permissions scheme with respect to either platform's content.

Figure 2E:
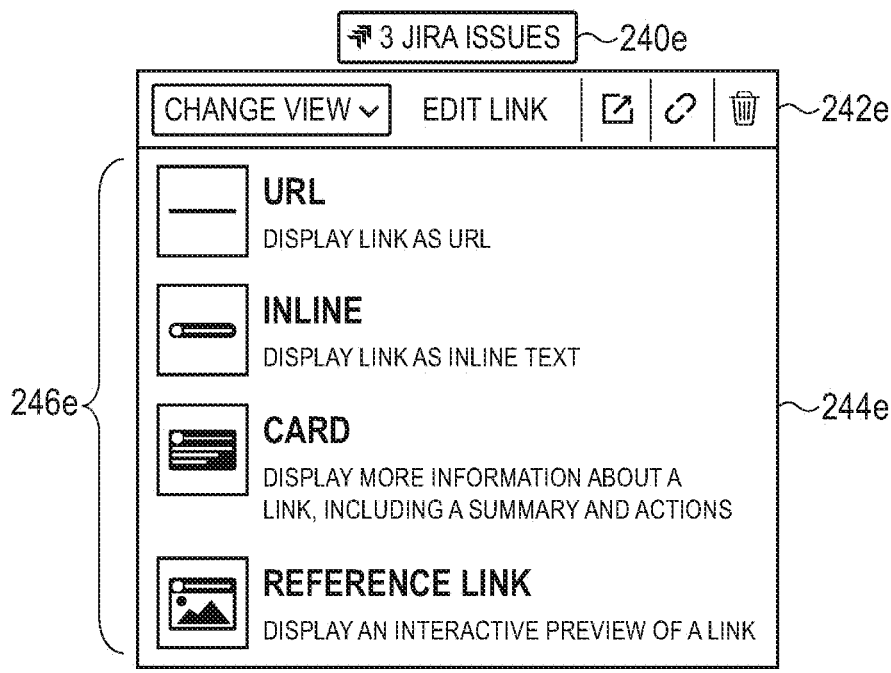
Figure 5:
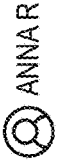
FIG. 5 depicts an example graphical user interface of an issue tracking system.

FIG. 2E depicts an example result of a user selection of all or some of the set of results produced using the object-discovery service and the link-creation window of the examples depicted in FIGS. 2A-2D. Specifically, three issues or issue objects were selected from the query-results region resulting in the creation of a single graphical selectable object 240e. Selection of the graphical selectable object 240e may result in a client device being redirected to the separate platform (here, the issue tracking platform) and cause one or all of the issues to be displayed on the client device using the separate platform. FIG. 5, described below, depicts an example graphical user interface 500 for a single issue, which may be displayed in response to a user selection of a selectable graphical object created in the content collaboration system or platform.

As shown in FIG. 2E, a link toolbar or control 242e may be displayed in response to a user input, such as a user selection or a mouse hover input. The toolbar or control 242e may include various options for modifying the display, format, or other attribute of the graphical selectable object 240e. For example, the link path, description, format, or other property of the graphical selectable object 240e may be changed in response to a selection of a respective control or element on the toolbar or control 242e. Additionally, selecting the "change view" control on the toolbar 242e causes display of a list of object options 246e in a drop-down menu element 244e. The list of object items 246e may be used to modify how the graphical selectable object 240e is displayed within the page or electronic document. FIG. 3 and FIGS. 4A-4E all depict example graphical elements that can be used to represent the graphical selectable object 240e and associated data objects (e.g., issue objects).

Figure 3:
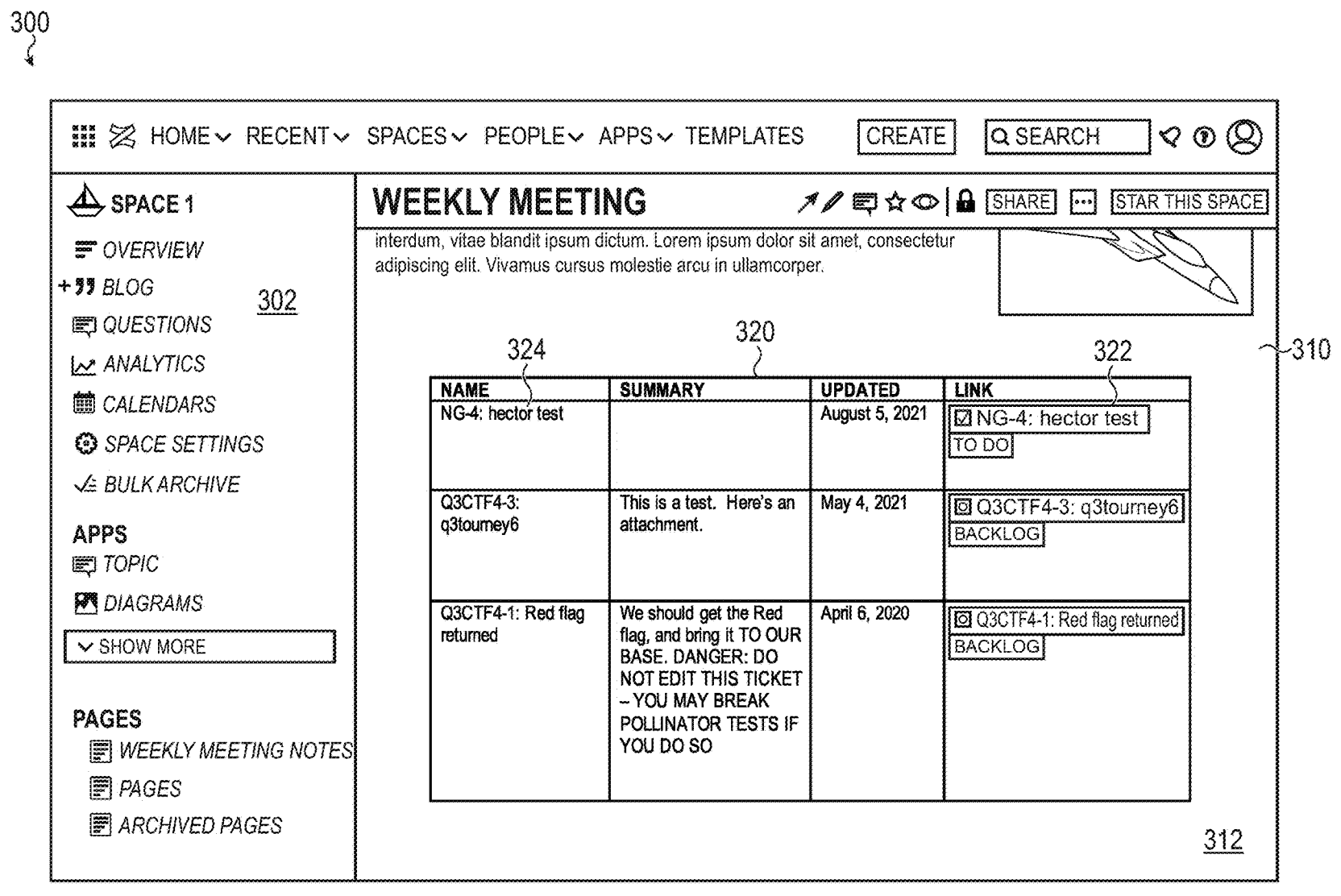

FIG. 3 depicts an example table object replacing the object-creation window in the content-creation region of the graphical user interface. Specifically, FIG. 3 depicts a graphical user interface 300 that includes a content-creation region 310 and navigation region 302 similar to the example described above with respect to FIG. 2A. The content-creation region 310 also includes user-generated content 312 which, in this case, includes a multi-element object, specifically a table object 320, that may be generated using the technique described above with respect to FIGS. 2A-2E.

In the present example, if multiple results are returned using the object-discovery service or tool described above with respect to FIGS. 2A-2E, the system may insert a table object 320 into the user-generated content 312. The table object 320 may replace the command line (e.g., 214 of FIG. 2a) or other similar input used to initiate the object-discovery service. The table object also replaces any previous graphical object or element (e.g., object 240e of FIG. 2E) that is used to represent the results generated by the object-discovery service. Generally, the object table 320 and other user-generated content 312 may be created when the graphical user interface 300 is in an edit- or content-creation mode. In response to a user input, the user-generated content 312 including the table object 320 may be saved as a page or electronic document. The page or electronic document may be published in response to additional user input or otherwise at the direction of the user and the page or document may be available to authenticated system users that have an appropriate permission level with respect to the published content and/or document space.

As shown in FIG. 3, the table object 320 includes multiple rows, each row corresponding to a respective result of the set of search results produced using the object-discovery service. Each row includes a selectable graphical object 322 that corresponds to the respective object returned as a search result. As the name implies, each selectable graphical object 322 is selectable (e.g., using a mouse or cursor selection command) to cause the display of the respective linked object. In the present example, the selectable graphical objects 322 each correspond to a respective issue object and, when selected, cause a redirection to an issue view within an issue tracking platform or application. In some cases, a selection causes the client device to launch an issue tracking client application or frontend and causes the issue tracking client to load or access the respective issue data associated with the issue object. In some implementations, a selection causes the graphical user interface of the browser to transition or redirect to an issue tracking platform frontend displaying the corresponding issue data. The issue data and issue tracking platform may be accessed via a URL within the browser and may require that the user be authenticated and have the appropriate level of permissions with respect to the issue object. An example frontend of an issue tracking platform or application is described below with respect to FIG. 5. In some implementations, the issue data is displayed in a new window or other graphical user interface element in response to a user selection of the corresponding selectable graphical object 322.

As shown in FIG. 3, the table object 320 also includes entries 324 that are generated in accordance with object data obtained from the corresponding issue object. In some cases, the entries 324 correspond to metadata that is associated with the issue object. The entries 324 may also include data or content extracted from the issue object including, for example, an issue title or name, an issue summary, an issue number or ticket number, an assignee, a last-edited date or other date information, or other information stored as part of the issue object. Once published and available to other users, the object data, including the entries 324 and/or the selectable graphical objects 322 may be displayed in accordance with a permission scheme of an authenticated user. In some cases, in accordance with an authenticated user not having at least view permissions with respect to any particular issue object, the corresponding object data including the entries 324 and/or the selectable graphical objects 322 may be suppressed from display within the graphical user interface 300 or otherwise not displayed. As described earlier, this prevents the techniques described herein from being used to reveal restricted content or otherwise circumvent a user-permissions scheme dictated by the issue tracking platform and/or the content collaboration platform.

FIG. 4A depicts a graphical selectable object created using the techniques described herein. Specifically, FIG. 4A depicts a graphical selectable object 400a corresponding to a single object. The graphical selectable object 400a may be displayed in a content-creation region and/or along with other user-generated content of a page or electronic document similar to as described herein with respect to FIG. 3. The graphical selectable object 400a includes object data 402a that is extracted from or obtained using the corresponding object. In the present example, the object data 402a includes an object graphic, which may correspond to the object or platform/application that provides the object, an issue number or ticket number, a title or description, and a status of the issue. Because this information is extracted from the underlying or linked issue object, a change to the data within the issue tracking platform or application will result in the modified or changed data within the graphical selectable object 400a automatically in response to the page or document being loaded or refreshed.

As shown in FIG. 4A, the graphical selectable object 400a may also have associated object controls 410a, 412a which may be used to modify the format, display, or other user-definable options with respect to the graphical selectable object 400a. In this example, the object control 410a includes a menu 414a with selections for various object types including, for example a URL view resulting in the display of the underlying URL path, an inline view which corresponds to the graphical selectable object 400a displayed in FIG. 4A, a card view resulting in the display of the object as a single tile or card, and an embed view resulting in the display of embedded content such as an object image, chart, GIF, or other graphical element. For each of these views (other than the URL view), the graphical selectable object 400a will be displayed with extracted object content, which may be dynamically updated in response to modifications or changes in the data due to edits or other activity performed using the issue tracking platform. The object control 412a provides distinct control elements (e.g., buttons) that may correspond to the entries displayed in the menu 414a. As shown in FIG. 4A, the object control 410a also includes options for sharing the link, editing the link path or object data, linking the object, or deleting or discarding the object. Either or both of the object controls 410a 412a may be displayed with the graphical selectable object 400a or may be revealed in response to a hover command or other corresponding user input performed with respect to the graphical selectable object 400a.

FIGS. 4B-4E depict example of multi-element objects created using the techniques described herein. Specifically, the examples of FIGS. 4B-4E depict multi-element objects that may be displayed along with other user-generated content of a page or electronic document. The examples of FIGS. 4B-4E may replace the table object 320 of FIG. 3 or may otherwise be generated in accordance with an object discovery process described above with respect to FIGS. 2A-2E.

Figure 4B:
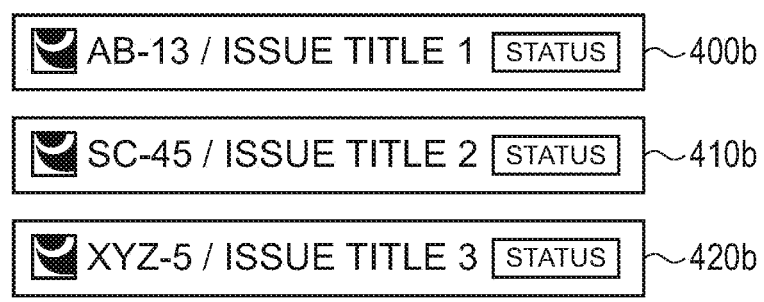

FIG. 4B depicts an array of graphical selectable objects 400b, 410b, 420b that may be generated in accordance with the object discovery process described herein. As shown in FIG. 4B, the graphical selectable objects 400b, 410b, 420b are displayed as an inline-view type graphical selectable object similar to the example of FIG. 4A. Also similar to the previous examples, the graphical selectable object includes object data that is extracted from each respective object. Further, each graphical selectable object 400b, 410b, 420b is selectable to cause redirection or display of the corresponding object (issue object) within the issue tracking platform. Further, similar to as described above with respect to FIG. 4A, a hover command or other corresponding user input may cause display of object controls that can be used to modify the display format or other attribute of the graphical selectable objects 400b, 410b, 420b.

Figure 4C:
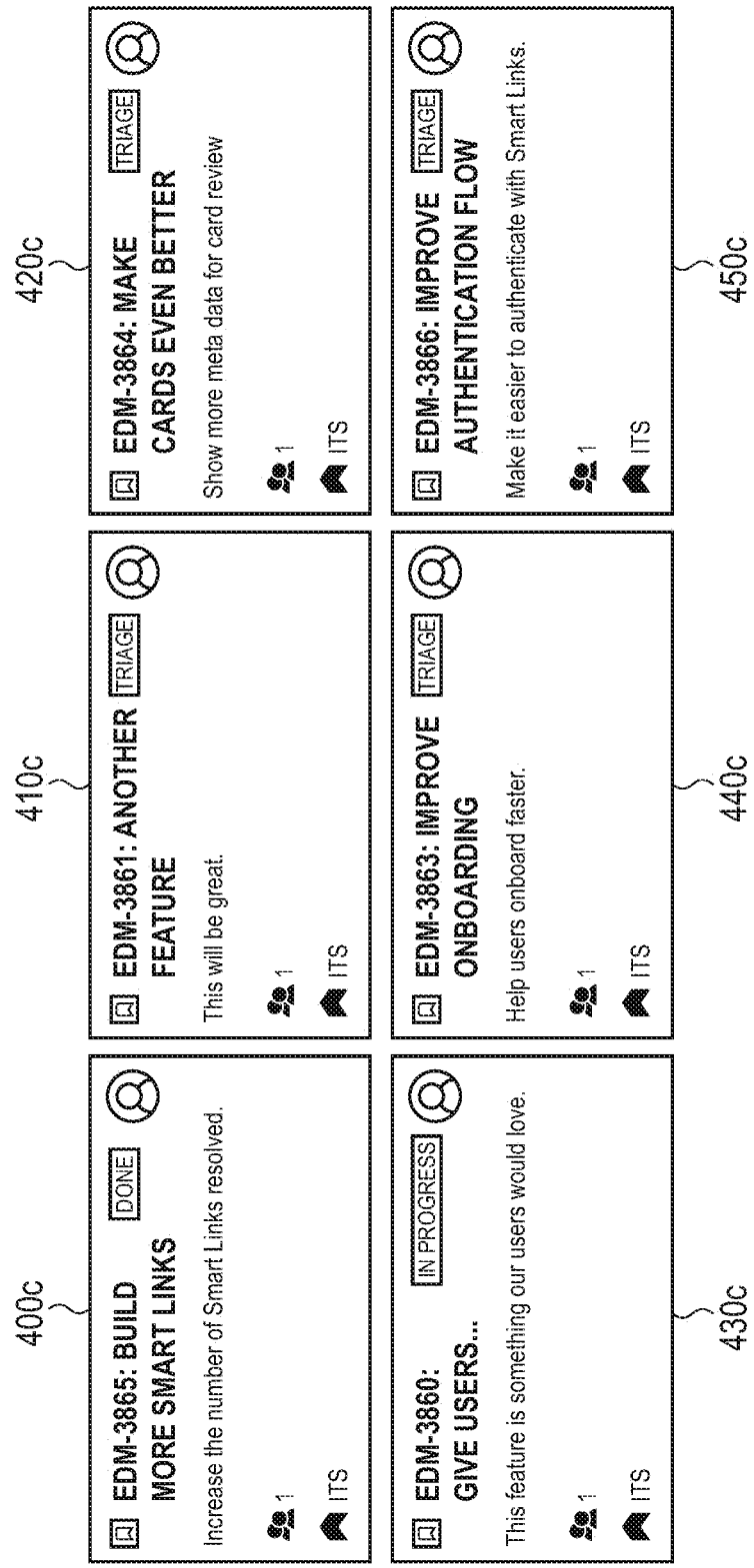

FIG. 4C depicts an array of graphical selectable objects 400c, 410c, 420c, 430c, 440c, 450c in which each of the graphical selectable objects is depicted in a card or tile view. Similar to the previous examples, the graphical selectable objects 400c, 410c, 420c, 430c, 440c, 450c each depicts updated object data and is selectable to cause redirection or display of the underlying object in the associated platform or software application. As shown in this example, each of the graphical selectable objects 400c, 410c, 420c, 430c, 440c, 450c may include graphical elements that correspond to the platform, issue data including a title, description, and status of the issue, and a graphical object that corresponds to the issue type or object type. In the present example, the card view also includes the number of users or user accounts associated with the issue (as an assignee or otherwise associated with the review or completion of the issue) along with a profile avatar of the user(s) displayed within the card. The profile avatar may be obtained from the issue tracking system or, in some implementations, from a directory service or user database integrated with the hosted services.

Figure 4D:
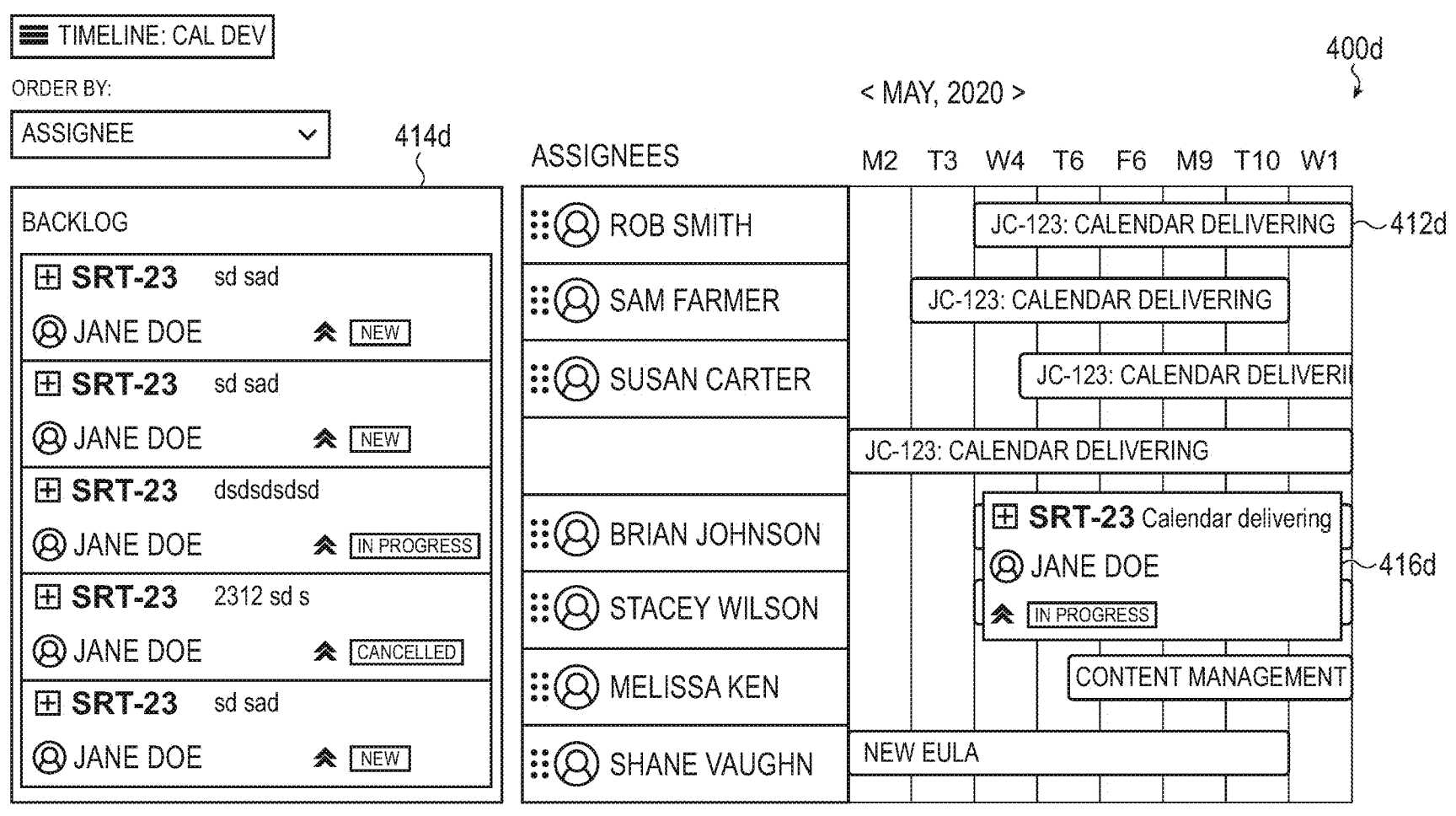
Figure 4E:
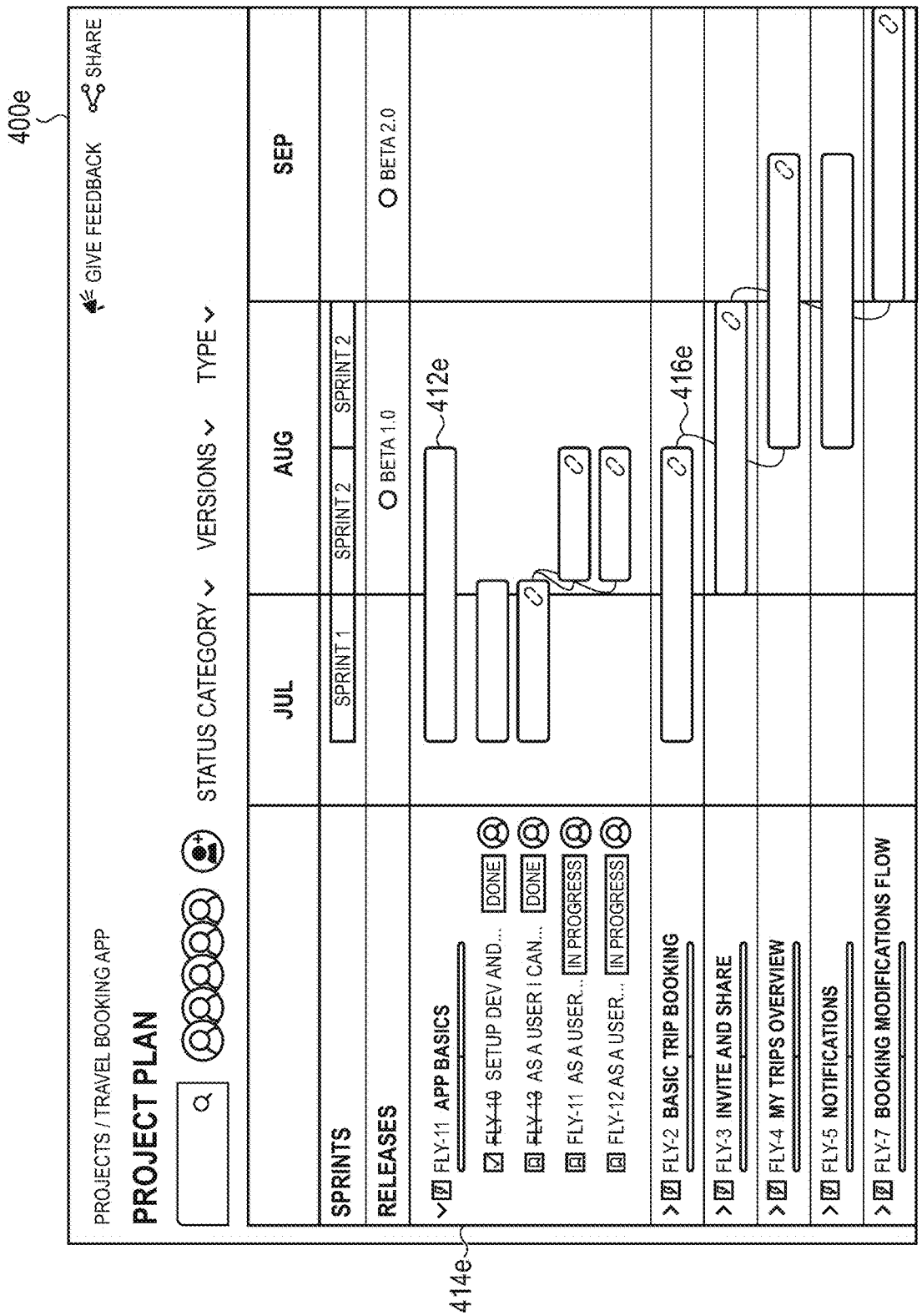

FIGS. 4D and 4E depict timeline 400d and project objects 400e, respectively. Either of the timeline 400d or project views 400e may replace or be displayed instead of the table object or other multi-element object described herein. As shown in FIG. 4D, the timeline object 400d includes multiple issue objects displayed as bar objects in a project timeline 412d. Each object may be placed on the project timeline 412d in accordance with start and estimated completion or completion dates extracted from the respective issue objects. Additional object data may be revealed in a floating window 416d or other similar graphical interface object in response to a hover command or other designated user input performed with respect to a particular object (e.g., bar object corresponding to a particular issue). The timeline object 400d may also include an object summary field 414d, which may include select object data depicted in card or list form. Each of the cards in the object summary field 414d and/or the bar objects associated with respective issue objects may be selectable to cause redirection to or display of a corresponding issue or linked object.

FIG. 4E depicts a project object 400e which includes bar objects 412e that each corresponds to a respective issue object. The project object 400e also includes a summary region 414e, which includes an expandable list of issue objects organized by epic, feature, or other parent-child relationship. As shown in FIG. 4E, the project object 400e may display object dependencies or relationships between the objects using either dependency connectors 416e or through the hierarchy of the expandable list depicted in the summary region 414e. Similar to the previous examples, each of the objects may be selectable to cause redirection to or display of a corresponding issue or linked object.

FIG. 5 depicts an example graphical user interface of an issue tracking system. Specifically, the graphical user interface 500 depicts issue object data associated with an issue managed and tracked by a corresponding issue tracking system or platform. As described previously, the graphical user interface 500 may be displayed in response to a user selection of one of the graphical selectable objects or associated objects described in the other examples provided herein. The graphical user interface 500 may be provided by a frontend or client of an issue tracking platform executing or operating on a client device. The graphical user interface 500 may include various issue or object data that is associated with the respective issue. As described previously, some of this issue data may be used to generate the graphical selectable object embedded or inserted in the document or page of the content collaboration platform. Further, changes to the issue data occurring due to input received at the graphical user interface 500 or otherwise implemented by the issue tracking system, will automatically be updated when the graphical selectable object of the respective page or document is loaded or refreshed. The graphical user interface 500 depicts the issue on a single screen, in many implementations, and the issue data may be displayed using a series of tabs or links available through the graphical user interface 500.

As shown in FIG. 5, the issue data includes text stored as fields or elements of the issue object. Issue fields include, for example, issue title, issue description, notes, and comments. Other issue data may include attachments or non-text content that is associated or stored with the issue object. Example non-text content includes screenshots, diagrams, and other graphical content that may be stored as image or other media files. Other example attachment content includes source code files, test results, user logs, and other similar content. The issue data may also include references or links to other system objects including, for example, projects or epics, which may have a parent-child relationship with the particular issue. Similarly, the issue data may include references or links to other issues identified as subtasks of the issue and may have a child-parent relationship with the particular issue. The issue data may also include references or pointers to other system elements like a system user or user profile identified as an assignee, owner, reviewer, or other role associated with the issue object.

Figure 6:
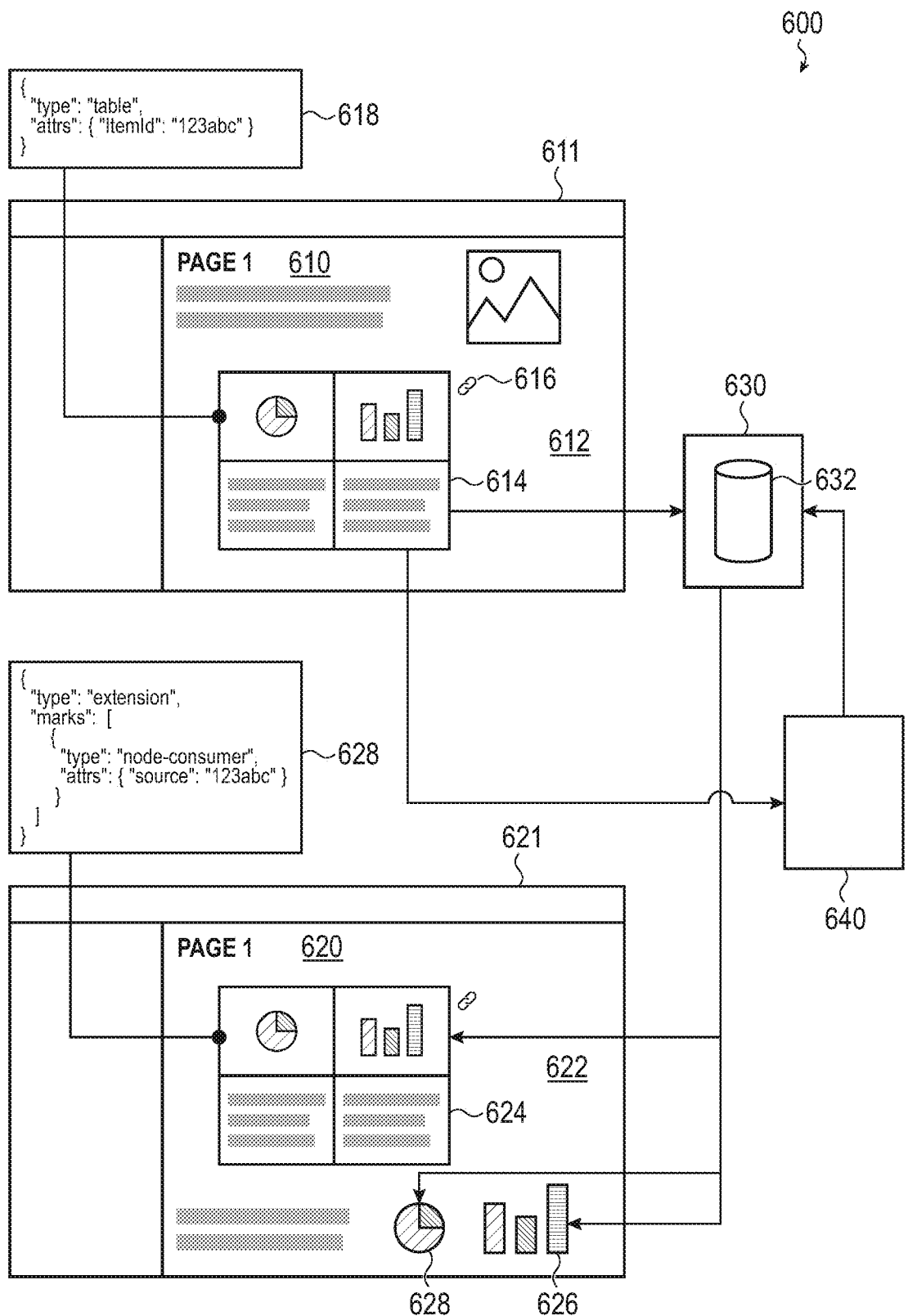
FIG. 6 depicts a system schematic for referencing document node content within multiple documents.
Figure 7B:
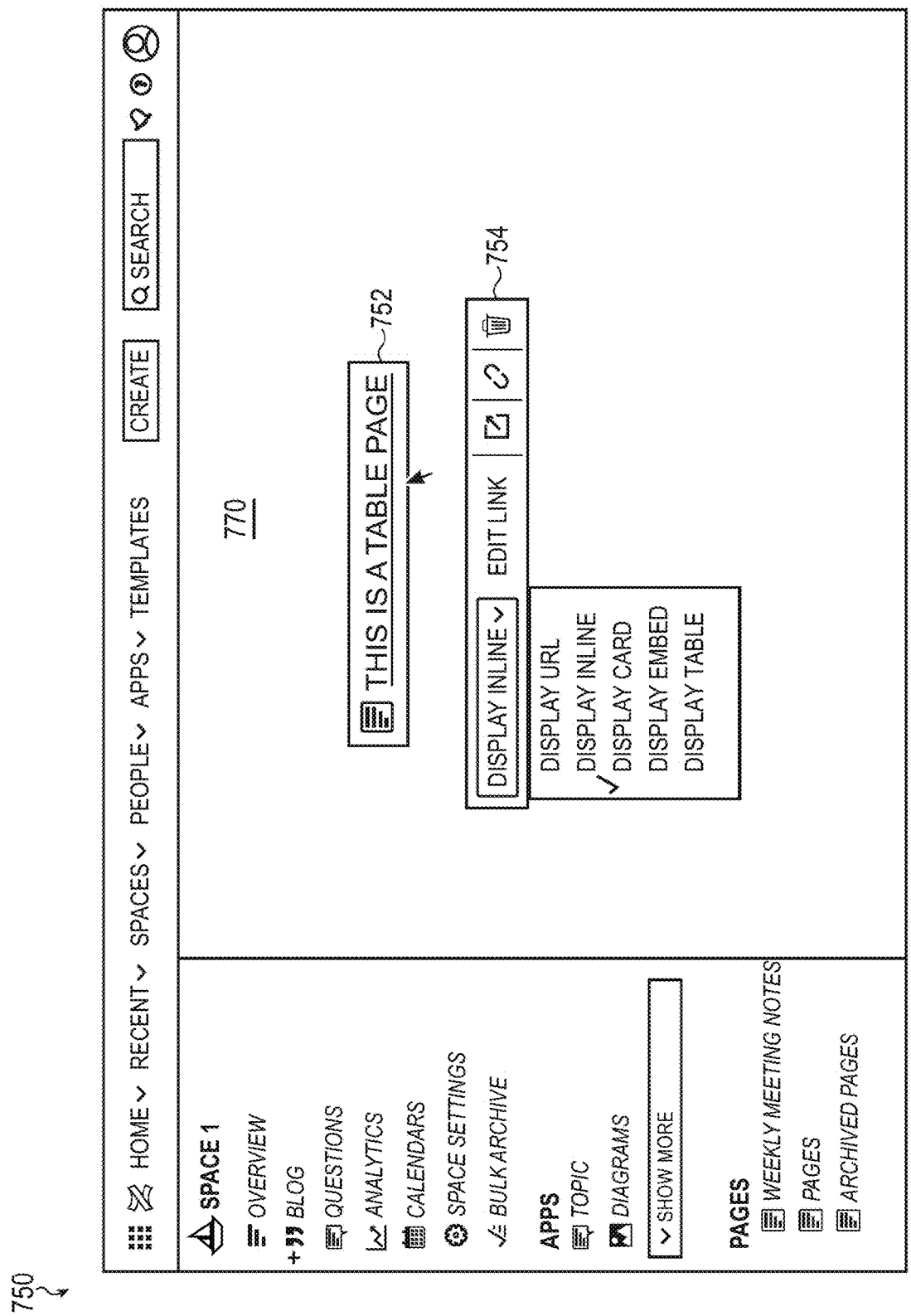

The examples described above are directed to searching and/or linking to multiple items, within user generated content. However, in some cases, it may be desirable to link to only a portion of a document or page. The examples of FIGS. 6-7B are directed to techniques for linking subdocument content across multiple documents or pages using a referential node system. As described in the examples below, a multi-element object or other portion of a structured document may be registered and/or stored in a separate data structure for access by other documents or pages within the content collaboration platform.

FIG. 6 depicts a system schematic for referencing document node content within multiple documents. Specifically, the system 600 includes a first or source page 610 which includes a document node 614 that is shared with a second or target page 620. As used herein, the term "node" may be used to refer to a portion of a document or a snippet of document content that is linguistically, logically, or spatially related within a document. In some cases, the term "snippet" or "document snippet" is used instead of the term "node." A reference to the document node 614 may be registered with or stored by the node provider 630, which includes a data store 632. The system 600 also allows for modification of the document node 614, which may be tracked by modification handler 640, which may be configured to listen for modifications performed on registered nodes (or receive modification event messages) in order to update the node provider 630. The node provider 630 and the modification handler 640 may be provided as node services, as described above with respect to item 129 of FIG. 1.

In the system 600 of FIG. 6, the document 610 may be displayed within a graphical user interface 611, which may be provided by a client application instantiated at a client device. Similar to the previous examples, the client application may be a frontend instance provided by a webbrowser application or a dedicated client application. Also similar to the previous examples, the graphical user interface 611 includes a content region or panel and the graphical user interface may be set in either a document view mode in which authenticated users having at least view permissions may view or read the content and a document edit mode in which the user-generated content 612 may be generated and/or modified by an authenticated user with at least write permissions with respect to the document 610. Similarly, the graphical user interface 621 displaying the second document 620 may be provided by a frontend instance provided by a web-browser application or a dedicated client application. The frontend instance providing the graphical user interface 621 may be instantiated on the same client device or a different client device as the graphical user interface 611. In some examples the graphical user interface 621 is the same as graphical user interface 611 but editing the second document 620 instead of the first document 610.

In the present example, both the first document 610 and the second document 620 and structured documents having various content items or nodes are stored in a hierarchical arrangement also referred to as a node tree. The node tree allows the rendering engine associated with the application (implemented either through the frontend instance or the backend instance) to render the content to provide the intended layout, format, and document structure as specified by the document author (authenticated user). In the present example, the table object (example document node) is defined within the structured document, at least in part, by node definition 618. The node definition defines an object or node type (e.g., "table") and includes an item identifier (e.g., "ItemId). In some implementations, the item identifier is a universally unique identifier that is not duplicated with respect to other content items or nodes within the content collaboration system. In some cases, the item identifier is a locally defined identifier and, when combined with a document identifier or other unique string, is used to define a universally unique identifier.

In the example of FIG. 6, the table object 614 may be defined as a special type of document object that is available for node linking operations. In particular, in the node definition 618, the node type may be designated as a type enabling registration and/or storage with respect to the node provider 630. The content type may be designated for the respective node definition 618 in response to a user input, such as a content edit command within the graphical user interface when operating in a document edit mode. In response to a user action, including for example, a link creation command or selection, a universally unique identifier computed using the ItemId may be passed to the node provider 630. In some cases, some or all of the object content is also transmitted to the node provider 630 and used to allow rendering of the object content by other documents or other aspects of the system. In the current examples, the registration of the table object 614 as a linkable node is triggered by a user link request action (as described in more detail below with respect to FIG. 7A). In the present example, the link request action may be triggered by selection of a link create control 616. However, other events may be used to trigger the registration of a linkable object including an object creation event or a save event (e.g., an intermittent autosave or manually triggered save event).

Subsequent to an object or node being registered with the node provider 630, the node may be available for insertion into other user-generated content of another document or page. In the present example, a locally rendered version of the registered node may be created as table object 624 within the user-generated content 622 of the second or target document 620. In particular, an insert node command or paste command may be entered with respect to a location within the user-generated content 622 of the second document 620. In response to the insert node command, the system may query the node provider 630 to identify the associated node content using the universally unique identifier. In some implementations, the universally unique identifier is used to identify either the node content within the structured source document (e.g., the first document 610) or identify the node content within the data store 632. Using a node rendering service, the node content may be rendered on either the backend application instance or the frontend application instance, depending on the configuration of the content collaboration system.

As shown in FIG. 6, the newly created instance of the table object 624 is defined, at least in part, by the node definition 628. In the present example, the node definition 628 includes a special object type identifying the node as linked content (e.g., "node-consumer") along with a local type or identifier. The node definition 628 also includes an attribute indicating the node content source, which in this case includes the ItemID used as the universally unique identifier or used to generate the universally unique identifier. The newly created instance of the table object 624 may also be registered with the node provider 630 and the node provider 630 and/or a corresponding subscriber service may record/store the document ID or other identifier that can be used to pass the target document any updated or modified node content. The target document 620 may also be described as a subscriber to the node content and newly rendered node content may be used to generate the user-generated content 622 when changes occur to the linked table object 614.

The new instance of the table object 624 may be created using the node content identified by the universally unique identifier and, thus, the table object 624 may represent a current or accurate version of the source table object 614. Further, as the source table object 614 or node is modified within the first document 610, a modification handler 640 may detect the modification and notify the node provider 630 that the node has been modified. The modification handler 640 may monitor or listen to an event stream generated by the content collaboration system or may be responsive to a node modification event (generated in response to a modification of the table object 614). The modification handler 640 may, in some instances trigger an update to the linked table object 624 causing the modified content to be rendered in the second document 620. In some cases, a modification is logged or otherwise accounted for by the node provider 630 and, in response to a loading or refreshing of the second document within the graphical user interface 621, the table object 624 may be newly rendered to reflect the modifications of the source table object 614.

In some implementations, the target table object 624 is editable to cause a corresponding modification to the source table object or node 614. For example, a modification of the table object 624 may be detected by the modification handler 640 and used to update node content that is either stored in the data store 632 of the node provider 630 or as stored within the first document 610. In this way, a document node that is linked across multiple documents may be editable in each of the linked documents and a synchronization of the node content may be performed in response to modification events or actions detected by the modification handler 640. The modification handler 640 and/or the node provider 630 may manage conflicts in edit priority or in modification sequence if multiple modifications occur concurrently. In other cases, the original table object 614 or node is the only editable instance of that node and other linked versions or instances are not able to be modified (e.g., read only).

In some implementations, the node provider 630 includes a node or snippet registry that registers the universally unique identifier with respect to linked nodes or document snippets. In some cases, the node provider 630 also includes a reference to the document (a document identifier), a reference to the document space, or other locating information within the content collaboration platform. In some instances, the node provider 630 stores the node content within the data store 632. The node content may be stored as a data graph in which nodes of the graph correspond to the document nodes or snippets. In implementations in which a data graph is used to store node content, a separate node registry may not be used.

As shown in FIG. 6, a similar technique can also be used to link or render even finer resolution node elements in a second or target document. As shown in the second document 620, nodes or elements 628 and 626 may also be linked to a source node element 614. In some implementations, linking a multi-element object, such as the table object 614 may allow for the use of a portion of the node content. In the present example, table cell content or values of the table object 614 may be referenced using the universally unique identifier and the node provider 630 and used to render the partial content within the target document 620. For sub-node or links, additional attributes may be included in the node definition (e.g., node definition 628) that specify the particular content to be used. For example, the respective node definition may specify the row and column of the content to be linked into the second document 620. In other implementations, the node definition may identify the new linked content to be a data consumer of the source node (e.g., table object) and may use the values in the table object to generate a graph (e.g., pie chart, bar graph) or other representation of the underlying data. In this way, linked content can be nested within a hierarchy of multiple levels and linking to a parent node or element of the document tree will allow the user to access child nodes and child node content.

In the present examples, the first document 610 and the second document 620 are structured documents in which user-generated text and other content may be marked or designated by content type. As mentioned previously, the structured document may include nodes (or may be parsed to identify nodes) which represent related portions of the document content. Example nodes include, without limitation, table objects, text blocks, lists, headings, images, arrayed elements, embedded content, and other forms of content that are used to generate the document or page. In some cases, the nodes correspond to Document Object Model (DOM) nodes of a document tree or hierarchical structure. While the structured document may be defined in a markup language such as HTML or Atlassian Data Format (ADF), other protocols or document schemes may also be used.

FIGS. 7A-7B depict example user-generated content for a first or source document and a second or target document. In particular, FIGS. 7A and 7B depict an example sequence that may be used to generate linked nodes or document snippets between two documents. As shown in FIG. 7A, a first instance of graphical user interface 700 may be provided by a frontend application instance on a client device. The graphical user interface 700 may include a content creation region or panel and the graphical user interface 700 may be operated in either a document view mode in which authenticated users having at least view permissions may view or read the user-generated content of the first document 720 or a document edit mode in which the user-generated content of the first document 720 may be generated and/or modified by an authenticated user with at least write permissions with respect to the first document 720. Similarly, the graphical user interface 750 displaying the second document 770 may be provided by a frontend instance provided by a web-browser application or a dedicated client application. The frontend instance providing the graphical user interface 750 may be instantiated on the same client device or a different client device as the graphical user interface 700. In some examples the graphical user interface 750 is the same as graphical user interface 700 but editing the second document 770 instead of the first document 720.

As shown in FIG. 7A, the user-generated content of the first document 720 includes a document snippet or node, in this case, an object table 710. The object table 710 is defined within the structured document 720 as with a type that enables it to be linked to other documents. The object table 710 is also associated with a universally unique identifier similar to the example provided above with respect to FIG. 6. In response to a user input (e.g., user selection of the link create control 712), a request or communication to a backend application instance is transmitted including the universally unique identifier and, optionally, other information about the respective node or snippet (here, table object 710). The request or communication may be transmitted to a node provider or other service operated by the backend application instance used to track linkable nodes or document snippets. If the node has already been registered, the selection of the link create control 712 may not result in a re-registration of the node. In some implementations, selection of the link create control 712 causes the universally unique identifier to be copied to a clipboard, cache, or other temporary storage. The operability of the link create control 712 may be restricted, in some implementations, to a document edit mode or other similar document modification mode of the graphical user interface 700. In other cases, the operability of the link create control 712 is available in the document view mode of the graphical user interface 700. The link create control 712 may be available or operable for any authenticated user having at least view permissions with respect to the document or snippet content.

FIG. 7B depicts an example link insertion state within the graphical user interface 750, which may be the same as graphical user interface 700 but at a later point in time and viewing a second document 770. In some cases, the graphical user interface 750 is a separate tab or browser window as the graphical user interface 700. As shown in this example, when the graphical user interface 750 is in a document edit or document create mode, a new instance of the table object 710 may be inserted in the user-generated content by a link-insertion command. In some cases, the link-insertion command is a paste command executed subsequent to a selection of the link create control 712 of FIG. 7A. In some cases, the link-insertion command is a line command entered directly into the editor. In some cases, the link-insertion command is provided by a menu selection or other graphical interface element.

As shown in FIG. 7B, in response to a link-insertion command, a request including the universally unique identifier may be transmitted to the backend application instance. Using the universally unique identifier, the backend application instance (using, for example a node provider service) may cause node content to be accessed and subsequently rendered within the second document 770. In the present example, the table object 710 is inserted as an in-line selectable graphical object 752 similar to the examples described above with respect to FIG. 4A. Also similar to the example of FIG. 4A, the selectable graphical object 752 is displayed along with object controls 754, which allow the user to modify or control the way in which the linked object will be displayed. For example, the object controls 754 may include an option to display the object 752 as a table, list, embedded content, or other representation that appears similar to the original source table object 710. In one example, the table object 710 of the first document 720 may display a list of items in the second document 770. Each list item of the list of items may correspond to a respective row of the table object 710. In another example, the table object 710 includes a set of values stored within or positioned within a respective set of cells. Instead of a table object, a graphical object, such as a data graph or other visualization, may be generated in the second document 770 using the set of values of the table object 710. Other object display types may also be selected in accordance with some of the examples described herein.

As described above with respect to FIG. 6, a modification to the source or original table object 710 may be reflected in a subsequent rendering of the target or linked object 752. In this way, the second document 770 may reflect the latest or accurate version of any content modified or added to the original table object 710. The modification of the table object 710 may be performed by editing the table object 710 within the first document 720. In some cases in which the object can be modified by multiple documents, a modification to the linked object 752 in the second document 770 may result in a similar or the same modification being displayed in the original table object 710 of the first document 720.

While the examples of linked document snippet or node content is provided with respect to a table object, other object types may also be used. For example, any of the selectable graphical objects including card objects, in-link objects, and other selectable objects, as described herein, can be used as an example node or snippet for linking across documents. Similarly, any of the multi-element objects including lists, card arrays, timelines, projects, and other similar content may be designated as linked or linkable snippets or document nodes. Furthermore, other document content including text blocks, headers, images, or other document content may also be linked in a fashion similar to as described herein. As described previously, linking may be enabled through a node definition designating the content as being eligible for selection and linking.

Many of the examples described herein are directed to table objects in which each row is generated in accordance with a respective issue of an issue tracking platform. As described in the previous example, node or sub-based node content may be updated from multiple documents creating a globally editable node. Similarly, all or portions of an issue object may be editable from both within the issue tracking platform and within a linked object like a table inserted in a document or page of a content collaboration platform. Similar to the example described above with respect to FIG. 6, a node provider may register and/or track linked content and, along with a modification handler or similar service, may allow edits performed within a content collaboration system to be propagated back to the original issue object data managed by the issue tracking platform.

FIGS. 8A-8B depict content modification operations with respect to a table or other multi-element object within user-generated content. As shown in FIG. 8A, a graphical user interface (e.g., a content-creation region or content-viewing region of a content collaboration platform) includes an example multi-element object 800a (e.g., a table object). As shown in FIG. 8A, each row of the multi-element object 800a corresponds to an issue or other object managed by a separate platform (e.g., an issue tracking platform). The multi-element object 800a may be created and inserted in user-generated content of a document or page, in accordance with the examples described above with respect to FIGS. 2A-3.

As shown in FIG. 8A, one or more of the data objects inserted into the table object 800a may be user editable. Specifically, in response to a user selection of a corresponding title 810a of an issue in the table object 800a, a window 812a may be displayed with additional issue data or content that is extracted from the corresponding issue object of the issue tracking system. The additional issue data may include an issue creator, an issue description, and other issue data. The window 812a may also include a control for launching a view of the issue either in another window or in an issue tracking interface similar to the example described above with respect to FIG. 5. Similar to the other examples described herein, the issue data displayed in the table object 800a (and in the window 812a) is rendered in accordance with data obtained from the issue tracking platform and, thus, should reflect the current state of the data. In some implementations, the issue data extracted from the issue object may be edited directly from either the window 812a or the cell of the table. Similar to the example of FIG. 6, edits received from the table object 800a or window 812a may be transmitted to a node provider or detected by the modification handler, which may cause the issue data to be changed within the issue tracking system.

FIG. 8B depicts another example of the multi-element object 800b or table object including multiple rows, each row associated with a respective issue object managed by a separate issue tracking platform. As shown in FIG. 8B, a user selection on a cell 820b with issue data may enable or trigger an interface 822b that allows the user to edit or modify the issue data. In this particular example, a status or state of an issue object tracked by the issue tracking platform may be changed via a floating window interface 822b, which includes selectable options for a new issue status or state. The options used to populate the interface 822b may be generated in response to a query submitted to the issue tracking platform. Because the issue tracking system is able to generate the list of options, in some cases, the options correspond to available states for the particular selected issue and invalid or unavailable options may not be displayed or listed. In response to a user selection of a particular option in the interface 822b, the system may be configured to modify the corresponding issue data for the particular issue within the issue tracking platform.

As shown in FIG. 8B, the ability to create new issues from within the content-creation region or editable field of the content collaboration system may be enabled by the table object 800b. In particular, the table object 800b includes object control 830b, which allows a new object to be created within the content collaboration system. In this case, the new object is a new issue that will be managed and tracked by the corresponding issue tracking platform. In response to a selection of the object control 830b, an issue creation dialogue or interface 840b may be generated with fields or regions for entering new issue data including, for example, title, description, project, assignee, and other issue data fields. On completion of entries in the issue creation dialogue or interface, the user may initiate the creation of a new issue. An example of issue fields and issue data that may be received in an interface is depicted in FIG. 5.

The table object 800b also includes a link-creation control 832b, which allows a user to find and link to additional objects. In one example, an object-discovery or link-discovery service or tool is invoked in response to a selection of the link-creation control 832b. An example link/object discovery interface and sequence is described above with respect to FIGS. 2A-3. The same or a similar process may be invoked in response to selection of the link-creation control 832b. In response to identifying one or more issues using the above-described process, the newly identified issues may be appended to the table object 800b.

Figure 9:
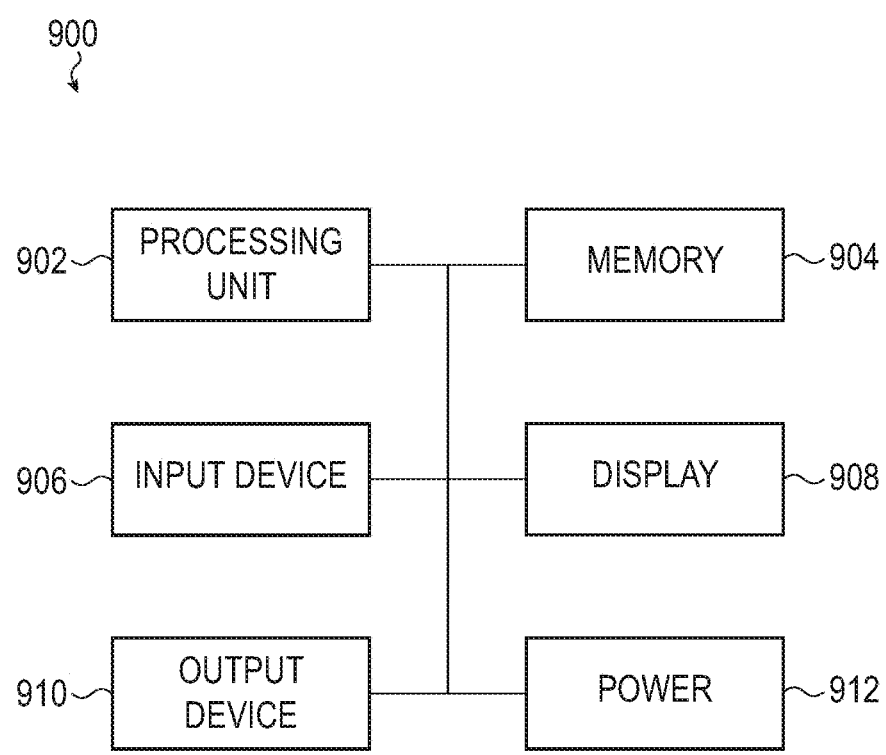
FIG. 9 depicts an example device in accordance with the embodiments described herein.

FIG. 9 depicts a sample electrical block diagram of an electronic device 900 that may perform the operations described herein. The electronic device 900 may in some cases take the form of any of the electronic devices described with reference to FIGS. 1-8B, including client devices, and/or servers or other computing devices associated with the system 100. The electronic device 900 can include one or more of a display 908, a processing unit 902, a power source 912, a memory 904 or storage device, input devices 906, and output devices 910. In some cases, various implementations of the electronic device 900 may lack some or all of these components and/or include additional or alternative components.

The processing unit 902 can control some or all of the operations of the electronic device 900. The processing unit 902 can communicate, either directly or indirectly, with some or all of the components of the electronic device 900. For example, a system bus or other communication mechanism can provide communication between the processing unit 902, the power source 912, the memory 904, the input device(s) 906, and the output device(s) 910.

The processing unit 902 can be implemented as any electronic device capable of processing, receiving, or transmitting data or instructions. For example, the processing unit 902 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements. It should be noted that the components of the electronic device 900 can be controlled by multiple processing units. For example, select components of the electronic device 900 (e.g., an input device 906) may be controlled by a first processing unit and other components of the electronic device 900 (e.g., the display 908) may be controlled by a second processing unit, where the first and second processing units may or may not be in communication with each other.

The power source 912 can be implemented with any device capable of providing energy to the electronic device 900. For example, the power source 912 may be one or more batteries or rechargeable batteries. Additionally or alternatively, the power source 912 can be a power connector or power cord that connects the electronic device 900 to another power source, such as a wall outlet.

The memory 904 can store electronic data that can be used by the electronic device 900. For example, the memory 904 can store computer-readable instructions that, when executed by the processing unit 902, may cause the device 900 to perform one or more of the operations or functions described herein. The memory 904 can also be used to store other electronic data or content including, for example, audio and video files, documents and applications, device settings and user preferences, timing signals, control signals, and data structures or databases. The memory 904 can be configured as any type of memory. By way of example only, the memory 904 can be implemented as random access memory, read-only memory, flash memory, removable memory, other types of storage elements, or combinations of such devices.

In various embodiments, the display 908 provides a graphical output, for example associated with an operating system, user interface, and/or applications of the electronic device 900 (e.g., documentation creation user interface, a chat user interface, an issue-tracking user interface, an issue-discovery user interface). In one embodiment, the display 908 includes one or more sensors and is configured as a touch-sensitive (e.g., single-touch, multi-touch) and/or force-sensitive display to receive inputs from a user. For example, the display 908 may be integrated with a touch sensor (e.g., a capacitive touch sensor) and/or a force sensor to provide a touch- and/or force-sensitive display. The display 908 is operably coupled to the processing unit 902 of the electronic device 900.

The display 908 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 908 is positioned beneath and viewable through a cover that forms at least a portion of an enclosure of the electronic device 900.

In various embodiments, the input devices 906 may include any suitable components for detecting inputs. Examples of input devices 906 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 906 may be configured to detect one or more particular types of input and provide a signal (e.g., an input signal) corresponding to the detected input. The signal may be provided, for example, to the processing unit 902. As discussed above, in some cases, the input device(s) 906 include a touch sensor (e.g., a capacitive touch sensor) integrated with the display 908 to provide a touch-sensitive display. Similarly, in some cases, the input device(s) 906 include a force sensor (e.g., a capacitive force sensor) integrated with the display 908 to provide a force-sensitive display.

The output devices 910 may include any suitable components for providing outputs. Examples of output devices 910 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 910 may be configured to receive one or more signals (e.g., an output signal provided by the processing unit 902) and provide an output corresponding to the signal.

In some cases, input devices 906 and output devices 910 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A computer-implemented method of rendering issue objects in a graphical user interface, the computer-implemented method comprising:

instantiating a client application on a client device, the client application displaying the graphical user interface having a content-creation region operating an editor configured to receive textual input via a keyboard of the client device;

receiving a command to initiate creation of a selectable graphical object within the content-creation region;

in response to receiving the command, invoking an object-creation service causing display of a link-creation window overlaying the content-creation region, the link-creation window comprising:

an expression editor region configured to receive text input and evaluate the text input to produce a structured issue query on an issue tracking system;

a query-results region configured to display a set of results produced on the evaluation of the structured issue query generated in response to the text input, the set of results automatically updated in response to a change in the text input; and an object-creation control;

in response to a user selection of the object-creation control, causing creation of a table object within the content-creation region, the table object including a set of rows, each row including a respective issue object corresponding to a respective issue of the set of results produced on the evaluation of the structured issue query; and in response to a save command, user-generated content including the table object is stored as a page of a content collaboration platform.

2. The computer-implemented method of claim 1, wherein:
 upon the display of the link-creation window, the expression editor region contains a default expression framework; and
 the default expression framework is user-editable through the expression editor region.

3. The computer-implemented method of claim 2, wherein:
 the expression editor region is operably coupled to the issue tracking system through an advanced programming interface;
 user input to the expression editor region causes a creation of a structured query; and
 the structured query is executed on an issue storage database of the issue tracking system using the advanced programming interface.

4. The computer-implemented method of claim 1, wherein user selection of the respective issue object in the table object causes a redirection to an issue tracking application displaying issue data of the respective issue.

5. The computer-implemented method of claim 1, wherein:
 the table object includes multiple columns;
 issue data extracted from the respective issue is inserted in one or more first columns of the multiple columns; and
 the respective issue object is positioned in a second column of the multiple columns.

6. The computer-implemented method of claim 5, wherein:
 the issue tracking system is configured to modify the issue data to generate updated issue data; and
 in response to the modification of the issue data, the updated issue data is displayed in the table object upon a subsequent load of the page in the content collaboration platform.

7. The computer-implemented method of claim 1, wherein:
 the method further comprises authenticating a user of the client device using a user credential received from the user and obtaining user permissions for a user account associated with the authenticated user;
 the user permissions specify at least read and edit permissions with respect to issues of the issue tracking system; and
 an object discovery tool is configured to suppress display of results for which the user permissions do not allow read access to corresponding issues of the issue tracking system.

8. The computer-implemented method of claim 1, wherein in response to a publish command, the page is published to a set of users of the content collaboration platform.

9. A computer-implemented method of rendering graphical selectable objects in a graphical user interface, the computer-implemented method comprising:
 causing display of the graphical user interface of a client application on a client device, the graphical user interface having a content-creation region operating an editor configured to receive user-generated content;
 receiving a command to initiate creation of a selectable graphical object within the content-creation region;
 in response to receiving the command, invoking an object-creation service causing display of an object-creation window overlaying the content-creation region, the object-creation window comprising:
  an expression editor region configured to receive text input and evaluate the text input to produce a structured query on a data store of a separate platform;
  a query results region configured to display a set of results produced on evaluation of the structured query generated in response to the text input; and
  an object-creation control;
 in response to a user selection of the object-creation control, causing creation of a table object within the content-creation region, the table object including a set of rows, each row including a respective graphical selectable object corresponding to a respective result of the set of results produced on the evaluation of the structured query; and
 in response to a save command, the user-generated content including the table object is stored as an electronic document of a content collaboration system.

10. The computer-implemented method of claim 9, wherein:
 the expression editor region is operably coupled to the separate platform through an advanced programming interface;
 user input to the expression editor region causes creation of a structured query; and
 the structured query is executed on a data store of the separate platform using the advanced programming interface.

11. The computer-implemented method of claim 9, wherein:
 each graphical selectable object of the table object is selectable from within the table object; and
 in response to selection of the respective graphical selectable object, the graphical user interface is redirected to an interface of the separate platform.

12. The computer-implemented method of claim 9, wherein:
 the separate platform is an issue tracking platform;
 the set of results corresponds to a set of issues managed by the issue tracking platform; and
 a selection of the respective graphical selectable object redirects the graphical user interface to an issue view interface of the issue tracking platform.

13. The computer-implemented method of claim 9, wherein:
 each row corresponds to a respective object managed by the separate platform;
 the separate platform includes an interface for editing the respective object; and
 in response to a modification to the respective object, content of the table object within the electronic document is automatically updated.

14. The computer-implemented method of claim 9, wherein:
 in response to a hover user input command, an object control is displayed proximate to the table object;
 in response to a user selection of an option displayed by the object control, cause the table object to be replaced with a list of objects; and
 an object of the list of objects corresponds to a row of the table object.

15. The computer-implemented method of claim 9, wherein:

in response to a first user input, an object control is displayed proximate to the table object;

in response to a second user input provided to the object control, cause the table object to be replaced with a project object; and the project object includes a set of timeline elements, each timeline element corresponding to a row of the table object.

16. A content collaboration platform comprising:

a content collaboration backend application operating on one or more servers, the content collaboration backend application operably coupled to a frontend application operating on a client device, the content collaboration backend application configured to:

cause display of a page generation graphical user interface on the frontend application operating on the client device, the page generation graphical user interface including a content-creation region;

in response to an invocation of an object-creation service, cause display of an object-creation window within the page generation graphical user interface, the object-creation window including:

an expression editor region configured to receive text input and evaluate the text input to produce a structured query on a data store of a separate backend application distinct from the content collaboration backend application;

a query results region configured to display a set of results produced on the evaluation of the structured query generated in response to the text input; and an object-creation control;

in response to a user selection of the object-creation control, cause creation of a multi-element object within the content-creation region, the multi-element object including a set of rows, each row including a respective graphical selectable object corresponding to a respective result of the set of results produced on the evaluation of the structured query; and in response to a save command, user-generated content including the multi-element object is stored as an electronic document of the content collaboration platform.

17. The content collaboration platform of claim 16, wherein selection of the respective graphical selectable object causes a redirection of the page generation graphical user interface to an interface generated in accordance with the separate backend application.

18. The content collaboration platform of claim 16, wherein:

each row includes data extracted from a respective object managed by the separate backend application; and a modification of the respective object by the separate backend application causes a corresponding change in respective data positioned in a respective row of a table object.

19. The content collaboration platform of claim 16, wherein:

the separate backend application is a backend application of an issue tracking platform; and the set of results corresponds to issues managed by the issue tracking platform that satisfy the structured query.

20. The content collaboration platform of claim 16, wherein:

in response to an input provided to an object control, cause a table object to be replaced with a list of objects; and each object of the list of objects corresponds to a respective row of the set of rows of the table object.

* * * * *